United States Patent
Ezrielev et al.

(10) Patent No.: US 12,468,781 B2
(45) Date of Patent: Nov. 11, 2025

(54) SYSTEM AND METHOD FOR REDUCTION OF DATA TRANSMISSION BY INFORMATION CONTROL WITH REINFORCED LEARNING

(71) Applicant: Dell Products L.P., Round Rock, TX (US)

(72) Inventors: Ofir Ezrielev, Be'er Sheva (IL); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 869 days.

(21) Appl. No.: 17/726,104

(22) Filed: Apr. 21, 2022

(65) Prior Publication Data
US 2023/0342429 A1    Oct. 26, 2023

(51) Int. Cl.
G06F 18/21    (2023.01)
G06F 16/2455    (2019.01)
G06N 20/00    (2019.01)

(52) U.S. Cl.
CPC ...... *G06F 18/217* (2023.01); *G06F 16/24556* (2019.01); *G06N 20/00* (2019.01)

(58) Field of Classification Search
CPC .. G06N 20/00; G06F 18/217; G06F 16/24556
See application file for complete search history.

(56) References Cited

U.S. PATENT DOCUMENTS

| | | | |
|---|---|---|---|
| 2014/0019397 A1* | 1/2014 | Alexander | H04W 4/029 706/46 |
| 2016/0026520 A1 | 1/2016 | Bouta et al. | |
| 2017/0351964 A1* | 12/2017 | Gross | G06F 13/37 |
| 2019/0044786 A1 | 2/2019 | Wouhaybi et al. | |
| 2019/0362027 A1* | 11/2019 | Jain | G06F 30/00 |
| 2020/0196105 A1* | 6/2020 | Hunter | G08B 21/0261 |
| 2021/0376853 A1 | 12/2021 | De et al. | |

OTHER PUBLICATIONS

Tayeh et al., A distributed real-time data prediction and adaptive sensing approach for wireless sensor networks, vol. 49, pp. 62-75, ISSN 1574-1192, https://doi.org/10.1016/j.pmcj.2018.06.007. (Year: 2018).*

Giouroukis et al., A Survey of Adaptive Sampling and Filtering Algorithms for the Internet of Things, DEBS '20: Proceedings of the 14th ACM International Conference on Distributed and Event-based Systems, pp. 27-38, Jul. 15, 2020. (Year: 2020).*

(Continued)

*Primary Examiner* — Barbara M Level
(74) *Attorney, Agent, or Firm* — WOMBLE BOND DICKINSON (US) LLP

(57) ABSTRACT

Methods and systems for managing data collection are disclosed. To manage data collection, a system may include a data aggregator and data collectors. The data aggregator may utilize an inference model to predict the future operation of data collectors, and a pattern selection model to sample data from data collectors at a specific frequency and sequence. The pattern may specify that some data collectors are not to be sampled at various points in time. By doing so, the system may be able to transmit less data, consume less network bandwidth, and consume less energy throughout a distributed system while still providing access to aggregated data.

20 Claims, 18 Drawing Sheets

(56) References Cited

OTHER PUBLICATIONS

Sanjoy et al., EP 2648389 B1, Adaptive sensor data selection and sampling based on current and future context. Translated English, pp. 1-19, filed Nov. 28, 2012. (Year: 2021).*
Dias et al. Adapting Sampling Interval of Sensor Networks Using On-Line Reinforcement Learning, Department of Information and Communication Technologies Universitat Pompeu, Fabra, Barcelona, Spain, arXiv: 1606.02193v2 [cs.NI] 6 pages, Jul. 13, 2016. (Year: 2016).*
Pearl, Judea. "Causal inference in statistics: An overview." Statistics surveys 3 (2009): 96-146. https://projecteuclid.org/journals/statistics-surveys/volume-3/issue-none/Causal-inference-in-statistics-An-overview/10.1214/09-SS057.short.
Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.
Kumar, Manoj, et al. "Genetic algorithm: Review and application." Available at SSRN 3529843 (2010). https://papers.ssrn.com/sol3/papers.cfm?abstract_id=3529843.
Lewandowski et al., "Classifier-Based Data Transmission Reduction in Wearable Sensor Network for Human Activity Monitoring", Sensors 2021, 21, 85. <https://dx.doi.org/10.3390/s21010085>, Dec. 25, 2020, 22 pages (Year: 2020).
Cui et al., "Classification of data aggregation functions in wireless sensor networks", Computer Networks, vol. 178, 107342, <https://doi.org/10.1016/j.comnet.2020.107342>, 13 pages (Year: 2020).
Liazid et al., "An improved adaptive dual prediction scheme for reducing data transmission in wireless sensor networks", Wireless Networks, 25:3545-3555, <https://doi.org/10.1007 /s11276-019-01950-7>, Feb. 2, 2019, 11 pages (Year: 2019).
Chen et al., "Online Model-Driven Data Acquisition for Wireless Sensor Networks", 2015 IEEE Wireless Communications and Networking Conference (WCNC). IEEE, 2015, 6 pages (Year: 2015).
Zhang et al., "Lightweight Self-Adapting Linear Prediction Algorithms for Wireless Sensor Networks", IEEE Sensors Journal, vol. 15, No. 5, May 2015, pp. 3050-3058 (Year: 2014).
Jain et al., "A Novel Data Prediction Technique Based on Correlation for Data Reduction in Sensor Networks", Proceedings of International Conference on Artificial Intelligence and Applications: ICAIA 2020. Springer Singapore, 2021, 12 pages (Year: 2020).
Lewandowski, M.; Płaczek, B.; Bernas, M.; Classifier-Based Data Transmission Reduction in Wearable Sensor Network for Human Activity Monitoring. Sensors 2021, 21, 85. https://doi.org/10.3390/s21010085.
Le Borgne, Yann-Aël & Santini, Silvia & Bontempi, Gianluca. (2007). Adaptive model selection for time series prediction in wireless sensor networks. Signal Processing. 87. 3010-3020. 10.1016/j.sigpro.2007.05.015.
Ankur Jain, Edward Y. Chang, Yuan-Fang Wang; Adaptive stream resource management using Kalman Filters. SIGMOD '04: Proceedings of the 2004 ACM SIGMOD international conference on Management of data Jun. 2004 pp. 11-22 https://doi.org/10.1145/1007568.1007573.
X. Feng, X. Zhenzhen, Y. Lin, S. Weifeng and L. Mingchu, "Prediction-based data transmission for energy conservation in wireless body sensors," 2010 The 5th Annual ICST Wireless Internet Conference (WICON), 2010, pp. 1-9.
Tulone, Daniela & Madden, Samuel. (2006). An energy-efficient querying framework in sensor networks for detecting hode similarities. 191-300. 10.1145/1164717.1164768.
Lu, Qing & Jiang, Weiwen & Xu, Xiaowei & Shi, Yiyu & Hu, Jingtong. (2019). On Neural Architecture Search for Resource-Constrained Hardware Platforms.
"Detecting data drift on data sets," Web page <https://docs.microsoft.com/en-us/azure/machine-learning/how-to-monitor-datasets?tabs=python>, Nov. 10, 2021, retrieved from Internet Archive Wayback Machine <https://web.archive.org/web/20210420083010/https://docs.microsoft.com/en-us/azure/machine-learning/how-to-monitor-datasets?tabs=python> on Apr. 27, 2022).
Msechu, Eric J. et al., "Sensor-centric data reduction for estimation with WSNs via censoring and quantization", IEEE Transaction on Signal Processing No. 60, No. 1, (2011), pp. 400-414 (15 pages).
Kilian Kiekenap et al., "Trade-off between measurement accuracy and quantization precision for minimum bayes risk in wireless networked control systems", SCC 2019; 12th International ITG Conference on Systems, Communication and Coding, VDE, 2019. pp. 59-64 (6 pages).
Yilmaz Yasin et al., "Sequential decentralized parameter estimation under randomly observed fisher information", IEEE transactions on information theory vol. 60, No. 2 (2013), pp. 1281-1300 (20 pages).

* cited by examiner

Hybrid Data 212

Sample Values 300

Predictions 302

FIG. 3

SYSTEM AND METHOD FOR REDUCTION OF DATA TRANSMISSION BY INFORMATION CONTROL WITH REINFORCED LEARNING

FIELD

Embodiments disclosed herein relate generally to data collection. More particularly, embodiments disclosed herein relate to systems and methods to limit the transmission of data over a communication system during data collection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows a block diagram illustrating hybrid data in accordance with an embodiment.

DETAILED DESCRIPTION

Figure 1:
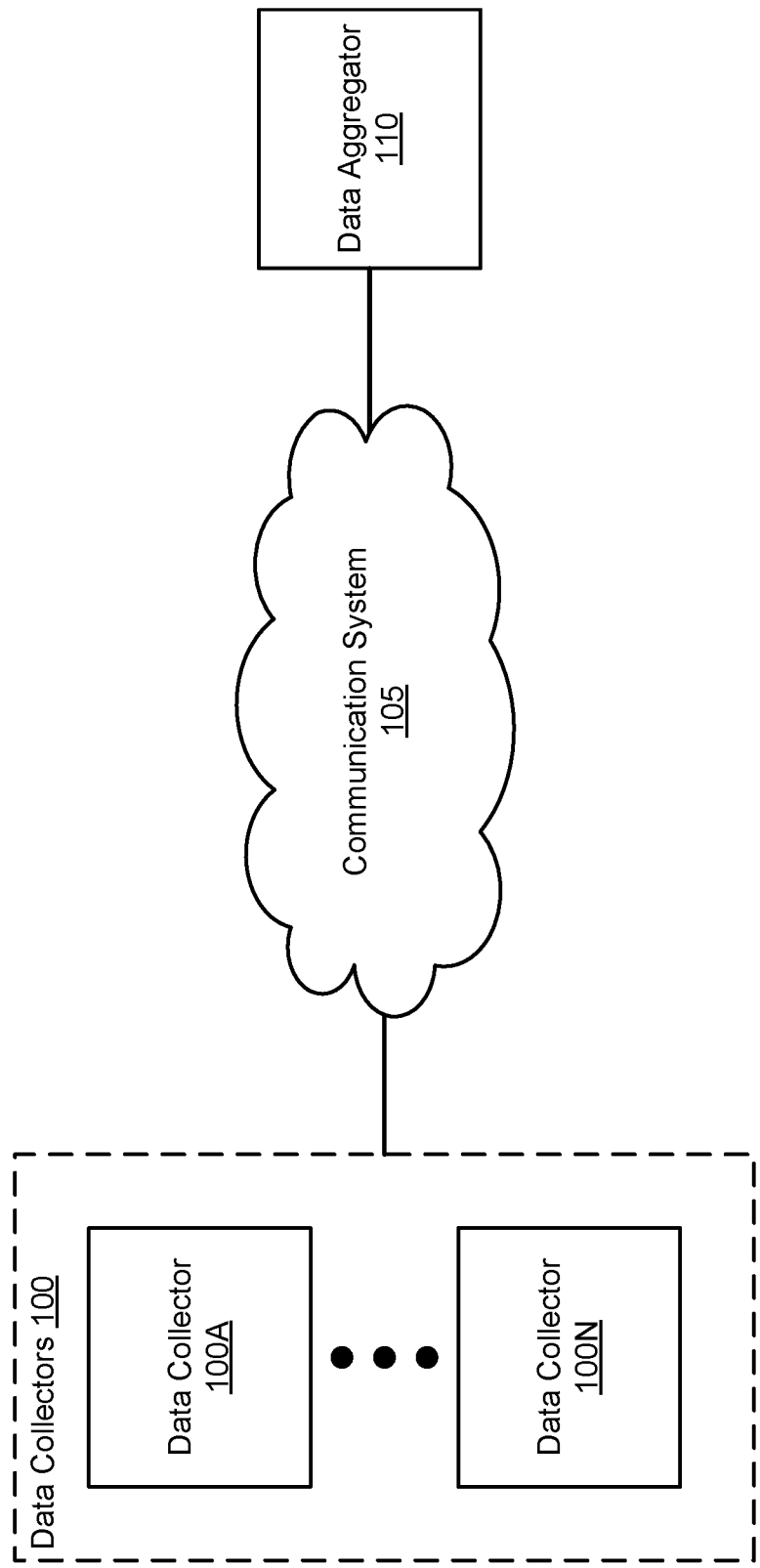
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data collection in a distributed system. To manage data collection, the system may include a data aggregator. The data aggregator may utilize inference models to predict future measurements from data collectors throughout a distributed system without having access to the measurements, and pattern selection models to control data transmission throughout a distributed system.

To obtain the inference models, training data may be used to train the inference models to predict future measurements obtained by the data collectors. The data collectors may include any type and quantity of data collectors including, for example, temperature data collectors, pH data collectors, humidity data collectors, etc. Therefore, the disclosed system may be broadly applicable to a wide variety of data collectors that may generate various types and quantities of measurements.

To attempt to reduce data transmission, the data aggregator may obtain a pattern selection model utilizing reinforced learning. The pattern selection model may provide guidance on how, when, and from which data collectors data should be obtained and from which data collectors should not be obtained. The pattern selection model may increase the likelihood of obtaining data from data collectors for which inaccurate predictions are likely to be made by inference models hosted by the data aggregator. When accurate predictions are made, the predictions may be sufficient to be treated as though the predictions were data actually obtained from the data collectors. Consequently, the data collectors may not need to communicate corresponding data because sufficiently accurate representations of the data (e.g., the predictions) may already be acquired by the data aggregators. However, sample values may need to be collected when there is an increased likelihood of a prediction being inaccurate. The reinforced learning process used to update the pattern selection model may cause data to be more likely to be retrieved from data collectors for which inaccurate predictions of their data are being made.

In an embodiment, a computer-implemented method for aggregating data in a data aggregator and collected by data collectors in a distributed system is provided. The method may include obtaining, by the data aggregator, a sampling pattern; obtaining, by the data aggregator, predictions of data collected by the data collectors; obtaining, by the data aggregator, the data collected from a portion of the data collectors defined by the sampling pattern; and updating, by the data aggregator, the sampling pattern based on the data collected from the portion of the data collectors and a portion of the predictions corresponding to the data collected from the portion of the data collectors.

The computer-implemented method may also include obtaining, by the data aggregator, second predictions of second data collected by the data collectors; and obtaining, by the data aggregator, the second data collected from a second portion of the data collectors defined by the updated sampling pattern.

The updated sampling pattern may be different from the sampling pattern.

The sampling pattern may be updated using reinforced learning, the reinforced learning modifying a pattern selection model adapted to generate the sampling pattern.

The sampling pattern may specify a frequency and a sequence of obtaining data samples from the data collectors, the sampling pattern indicating that the data collected from a third portion of the data collectors is not to be obtained, and the predictions corresponding to the data collected by the third portion of the data collectors is to be treated, by the data aggregator, as accurate without comparison to the data collected by the third portion of the data collectors.

The data may be obtained via a communication system that operably connects the data collectors to a data aggregator, wherein the communication system has a communication bandwidth.

The sampling pattern may be based, at least in part, on the communication bandwidth.

The computer-implemented method may additionally include storing a portion of the predictions and the data collected from a portion of the data collectors defined by the sampling pattern as validated data, the validated data being treated by the data aggregator as accurate representations of measurements performed by the data collectors.

In an embodiment, a non-transitory media that include instructions that when executed by a processor cause the computer-implemented method to be performed is provided.

In an embodiment, a data processing system that includes the non-transitory media and a processor, and performs the computer-implemented method when the instructions are executed by the processor is provided.

Turning to FIG. 1, a block diagram illustrating a system in accordance with an embodiment is shown. The system shown in FIG. 1 may provide computer implemented services that may utilize data collected from various sources throughout a distributed environment (e.g., one or more devices connected to one another that may operate independently or in cooperation with one another).

The system may include data aggregator 110. Data aggregator 110 may provide all, or a portion, of the computer implemented services. For example, data aggregator 110 may provide computer implemented services to users of data aggregator 110 and/or other computing devices operably connected to data aggregator 110. The computer implemented services may include any type and quantity of services which may utilize, at least in part, data collected from a variety of sources (e.g., data collectors 100) within a distributed environment.

For example, data aggregator 110 may be used as part of a control system in which data that may be obtained by data collectors 100 is used to make control decisions regarding the operation of an industrial process. Data such as temperatures, pressures, etc. may be collected by data collectors 100 and aggregated by data aggregator 110. Data aggregator 110 may modify the operation of the industrial process using the collected data. For example, in an industrial environment data aggregator 110 may decide when, or when not, to activate valves, turn on or off motors, etc. using the collected data. Data aggregator 110 may be utilized in other types of environments without departing from embodiments disclosed herein.

To facilitate data collection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively provide data collection services.

For example, all, or a portion, of data collectors 100 may provide data collection services to users and/or other computing devices operably connected to data collectors 100. The data collection services may include any type and quantity of services including, for example, temperature data collection, pH data collection, humidity data collection, etc. Different systems may provide similar and/or different data collection services.

To provide the computer implemented services, the data collected by data collectors 100 may be transmitted across communication system 105 to data aggregator 110 (and/or other devices). The transmission of large quantities of data over communication system 105 may have undesirable effects on the communication system 105, data aggregator 110, and/or data collectors 100. For example, transmitting data across communication system 105 may consume network bandwidth and increase the energy consumption of data collectors 100 used for data transmission.

In general, embodiments disclosed herein may provide methods, systems, and/or devices for providing computer implemented services using data from sources within a distributed system while limiting data transmission for data aggregation purposes. To do so, data aggregator 110 may attempt to predict the data that would be provided by the sources within the distributed system. However, these predictions may be inaccurate. To identify inaccuracy, data aggregator 110 may sample data from the data sources for a portion of the predicted data based on a sampling pattern. The sampling pattern may be refined over time such that the samples taken based on the sampling pattern are more likely to be associated with predictions that are likely to be inaccurate. By doing so, a system in accordance with an embodiment may limit the transmission of data between components of the system while ensuring that all components that need access to the data to provide their respective functions are likely to have access to accurate data (e.g., such as the data collected by data collectors 100). By limiting the transmission of data, communication bandwidth of the system of FIG. 1 may be preserved, energy consumption for data transmission may be reduced, etc.

To provide its functionality, data aggregator 110 may (i) obtain a sample value from a data collector, (ii) obtain predictions of data that would be provided by each data collector if a sample value is obtained from the respective data collector, (iii) make a determination that the sample value does, or does not, match one of the predictions that corresponds to the data collector from which the sample value is obtained by performing a comparison between these values, (iv) promote each sample value to validated data, (v) promote each prediction without a complementary sample value to validated data, (vi) when the one of the predictions is determined to be inaccurate, continue use of the pattern selection model in use (e.g., treat the sample pattern as working well for data accuracy purposes), and (vii) when one of the predictions is determined to be accurate, update the pattern selection model (e.g., treat the sample pattern as not working well for data accuracy purposes). By doing so, data aggregator 110 may perform data collection within the distributed system without obtaining (all of, or a portion thereof) the data from data collectors 100 and, therefore, reduces data transmission over communication system 105.

When operating, any number of data collectors (e.g., 100A-100N) within data collectors 100, independently and/or cooperatively, may (i) obtain temporary values (e.g., such as the values obtained by data collectors 100 based on measurements of an ambient environment) which data aggregator 110 may need access for providing its computer implemented services, (ii) make a determination to send (all or a portion of) the temporary values via communication system 105 to the data aggregator 110 if a sampling pattern being implemented by data aggregator 110 indicates such values are to be transmitted, (ii) make a determination to not send (all or a portion of) the temporary values via communication system 105 to data aggregator 110 if a sampling pattern being implemented by data aggregator 110 indicates such values are not to be transmitted, and (iii) remove temporary values from data collector 100A-100N after the determination is made and any temporary values are sent based on the decisions.

Any of the components illustrated in FIG. 1 may be operably connected to each other (and/or components not illustrated) with communication system 105. In an embodiment, communication system 105 includes one or more networks that facilitate communication between any number of components. The networks may include wired networks and/or wireless networks (e.g., and/or the Internets). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2:
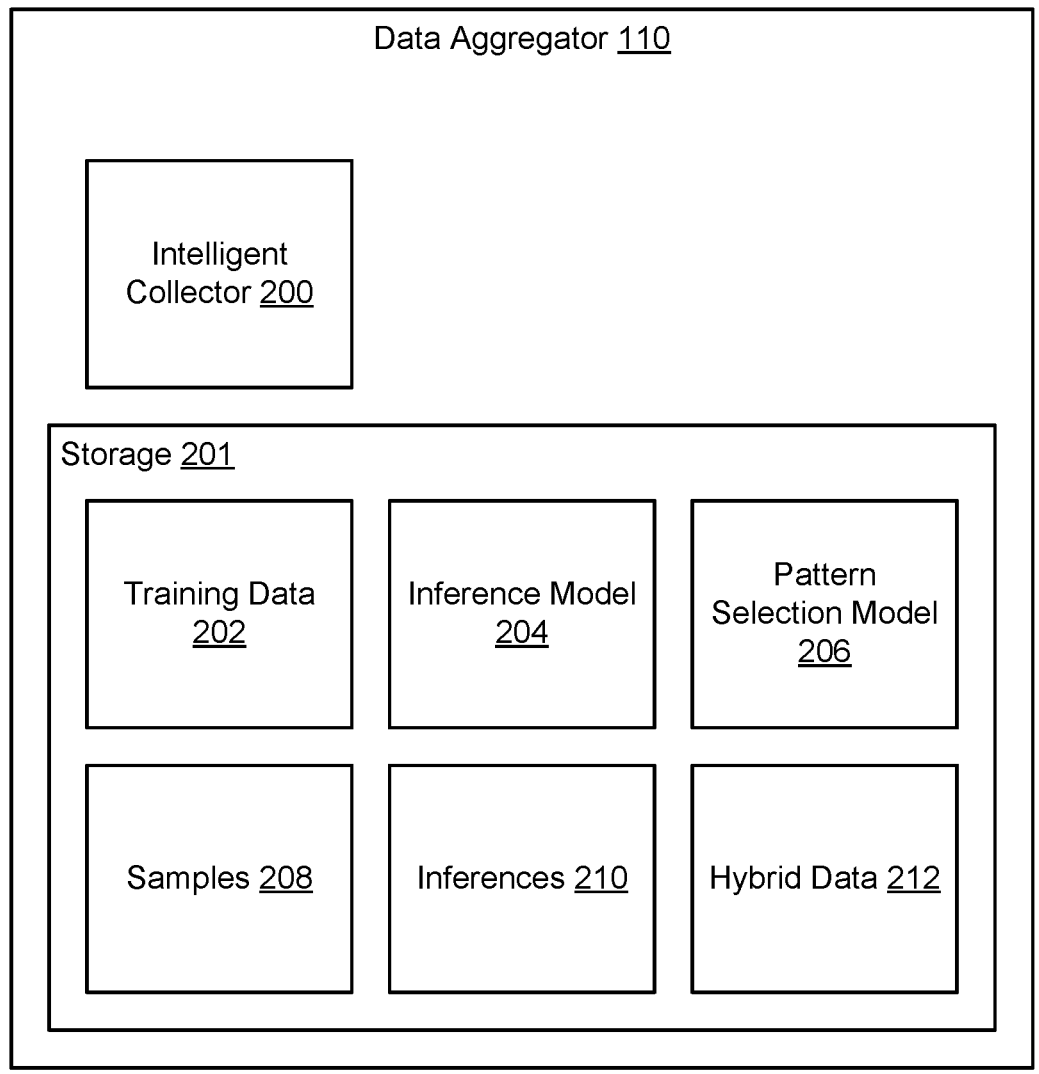
FIG. 2 shows a block diagram illustrating a data aggregator in accordance with an embodiment.

Turning to FIG. 2, a diagram of data aggregator 110 in accordance with an embodiment is shown. Data aggregator 110 may provide data collection services. The data collection services may provide for proactive identification and/or remediation of undesired data collection processes that may occur in the future. To provide its functionality, data aggregator 110 may include intelligent collector 200 and storage 201. Each of these components is discussed below.

Intelligent collector 200 may (e.g., to provide all, or a portion, of the data collection services): (i) obtain an inference model 204, (ii) obtain a pattern selection model 206, (iii) obtain temporary values (e.g., such as the values obtained by data collectors 100, all or a portion of, based on measurements of an ambient environment) based on a sampling pattern obtained with pattern selection model 206, the sampling pattern may indicate such values are to be transmitted to data aggregator 110, which may be stored (at least in part) as samples 208, (iv) obtain predictions of temporary values and associated prediction uncertainties, the temporary values reflecting data that may be provided by each data collector if temporary values are obtained from the respective data collector, which may be stored (at least in part) as inferences 210, (v) determine accuracy of the predictions based on a comparison between one of the predictions and a corresponding temporary value, (vi) when the prediction is determined as being accurate, then the pattern selection model 206 is updated in a manner that results in the generation of sampling patterns that may differ from those sampling patterns previously generated, and the sampling pattern may be updated at least in part on the associated prediction uncertainties, (vii) when the prediction is determined as being inaccurate, the pattern selection model 206 may be updated, but the updated pattern selection model may continue to generate similar sampling patterns to those previously generated, and the sampling pattern may be updated at least in part on the associated prediction uncertainties, (viii) promote samples 208 to validated data after accuracy of the prediction is determined, (ix) promote inferences 210, whose accuracy was not determined, to validated data, and (x) store validated data as hybrid data 212.

In an embodiment, intelligent collector 200 is implemented using a hardware device including circuitry. The hardware device may be, for example, a digital signal processor, a field programmable gate array, or an application specific integrated circuit. The circuitry may be adapted to cause the hardware device to perform the functionality of intelligent collector 200. Intelligent collector 200 may be implemented using other types of hardware devices without departing embodiment disclosed herein.

In one embodiment, intelligent collector 200 is implemented using a processor adapted to execute computing code stored on a persistent storage that when executed by the processor performs the functionality of intelligent collector 200 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including training data 202, inference model 204, pattern selection model 206, samples 208, inferences 210, and/or hybrid data 212. Any of these data structures is usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, training data 202 is implemented using one or more data structures that include any type and quantity of data that may be used to obtain an inference model. For example, training data 202 may include a time series relationship of a quantity. Such relationships may be used, for example, to train machine learning models, perform regression analysis, and/or perform other processes for obtaining inference models, which may be stored as inference model 204. In an embodiment, all or a portion of training data 202 is obtained via data collectors 100.

For example, data collectors 100 may measure a temperature of an ambient environment over five time periods. The resulting measurements may indicate temperatures of 94°, 97°, 99°, 96°, and 95°, respectively for the five time periods (e.g., every hour for five hours). In this scenario, for example, training data 202 may include a table with rows associated with different points in time and entries indicating the corresponding temperatures for those periods of time.

In an embodiment, inference model 204 is implemented using one or more data structures that include any type and quantity of data that may be used to obtain predictions. For example, inference model 204 may include a function usable to predict a quantity at a future point in time. Such relationships may be used, for example, to predict values in an ongoing data collection, perform linear prediction, and/or perform other processes for obtaining predictions, which may be stored as inferences 210.

In an embodiment, all or a portion of inference model 204 is obtained via training data 202. For example, training data 202 may have a data set taken from data collectors 100 measuring a pressure of an ambient environment over five time periods. The resulting measurements may indicate pressures of 0.50 psi/ft., 0.43 psi/ft., 0.47 psi/ft., 0.48 psi/ft., and 0.50 psi/ft., respectively for the five time periods (e.g., every hour for five hours). In this scenario, for example, inference model 204 may include an equation associated with a relationship between time and entries indicating the corresponding pressures for those periods of time. The equation may then be used to predict corresponding pressures for another five time periods.

In an embodiment, pattern selection model 206 is implemented using one or more data structures that include any type and quantity of data that may be used to obtain a sampling pattern. For example, pattern selection model 206 may include a function which may specify a sampling pattern over time. Such sampling patterns may be used, for example, to sample values linearly, perform a complex pattern of sampling, and/or perform other processes for obtaining sample values, which may be stored as samples 208.

In an embodiment, all or a portion of pattern selection model 206 is based on training data 202, samples 208, and/or inferences 210, and is implemented (at least in part) by intelligent collector 200.

For example, inferences 210 may have a data set of temperatures of an ambient environment over five time periods. The measurements corresponding to the temperature predictions may indicate temperatures of 94°, 97°, 99°, 96°, and 95°, respectively for the five time periods (e.g., every hour for five hours). Pattern selection model 206 may, for example, attempt to predict a pattern, based on these measurements and predictions, that is likely to sample future measurements that are different from future predictions while avoiding sampling of future measurements that are similar to the future predictions. To do so, for example, pattern selection model 206 may be implemented with a reinforced learning technique that incentivizes selection of measurements and inferences that differ from one another.

In this scenario, for example, pattern selection model 206 may make a determination, based on inference 210 (at least in part), to take sample values from the data collectors in a particular order at different points in time (e.g., data collector 1 at a first time interval, data collector 4 at a second time interval, data collector 3 at a third time interval, etc.).

In an embodiment, samples 208 includes any number of samples. The samples may include any range of values obtained from data collectors 100 and/or a network connected to data collectors 100. The samples may be stored (at least in part) as hybrid data 212 after the samples are processed by the intelligent collector 200.

In an embodiment, all or a portion of samples 208 is obtained using sampling patterns from pattern selection model 206. For example, data collectors 100 may measure a pressure of an ambient environment over five time periods. Pattern selection model 206 provide a sampling pattern that indicates that sample values are to be obtained in a particular order from different data collectors at different point in time. The resulting measurements may indicate pressures of 0.50 psi/ft., 0.43 psi/ft., 0.47 psi/ft., 0.48 psi/ft., and 0.50 psi/ft., respectively for the five time periods (e.g., every hour for five hours), and respectively for each data collector in the sampling pattern order. The resulting measurements may then be stored as samples 208.

In an embodiment, inferences 210 include any number of predictions. The predictions may include any type and/or quantity of values predicted by inference model 204. The predictions (all, or a portion) may be stored as part of hybrid data 212 after the predictions (all, or a portion) are processed by the intelligent collector 200.

In an embodiment, all or a portion of inferences 210 is obtained via inference model 204. For example, training data 202 may include training data obtained from data collectors 100 which may measure a temperature of an ambient environment over five time periods. The resulting measurements may indicate temperatures of 94°, 97°, 99°, 96°, and 95°, respectively for the five time periods (e.g., every hour for five hours). In this scenario, for example, inference model 204 may include an equation (or other predictive function/model/etc.) associated with a relationship between time and entries indicating the corresponding temperatures for those periods of time. The equation may then be used to predict corresponding temperatures for another five time periods. The resulting predictions may indicate temperatures of 95°, 97°, 98°, 99°, and 970 respectively for the five time periods (e.g., every hour for five hours). These resulting predictions may be stored as inferences 210.

In an embodiment, hybrid data 212 may include any number of predictions and/or sample values. The hybrid data may include any range of values predicted by inference model 204, and/or sample values from samples 208. The predictions (all, or a portion) may be stored as hybrid data 212 after the predictions (all, or a portion) may be processed with corresponding sample values from samples 208 by the intelligent collector 200.

In an embodiment, hybrid data 212 is obtained via a comparison made by the intelligent collector 200 between samples 208 and inferences 210. For example, inference model 204 may predict pressures that would be measured from data collector 100A of an ambient environment over six time periods (e.g., every hour for six hours). The resulting predictions may indicate pressures of 0.50 psi/ft., 0.43 psi/ft., 0.47 psi/ft., 0.48 psi/ft., 0.47 psi/ft., and 0.50 psi/ft., respectively, and may be stored as inferences 210. The pattern selection model 206 may make a determination to take a sample value from data collector 100A at the first, second and sixth hour over the six-hour period. The resulting measurements may indicate pressures 0.50 psi/ft., 0.65 psi/ft., and 0.50 psi/ft., respectively, and may be stored as samples 208. The measurements may be compared to corresponding pressure predictions from inferences 210 for those periods of time. Once a comparison has occurred, the measurements from samples 208 may be stored in hybrid data 212 along with the non-corresponding pressure predictions from inferences 210 (e.g., The prediction for data collector 100A at the third, fourth and fifth hour of the six-hour period).

For additional details regarding hybrid data 212, refer to FIG. 3 and the corresponding description below.

While illustrated in FIG. 2 with a limited number of specific components, a data aggregator may include additional, fewer, and/or different components without departing from embodiments disclosed herein.

Turning to FIG. 3, a diagram illustrating hybrid data 212 in accordance with an embodiment is shown. As discussed above, hybrid data 212 may be implemented using one or more data structures including sample values 300 and predictions 302. Any of these data structures may be usable by components of the system in FIG. 1.

In an embodiment, all values from samples 208 may be stored in sample values 300. All, or a portion of, inferences 210 may be stored in predictions 302. Values from samples 208 and inferences 210 may be stored after a comparison is made between values from samples 208 and inferences 210 by the intelligent controller 200.

For example, samples 208 may include a data set of temperature measurements obtained over a period of 6 hours from a data collector. These measurements may include 95°, 97°, and 98°, for the first hour, second hour, and sixth hour, respectively. Inferences 210 may include a data set of predictions pertaining to each hour in the six-hour period. These values may include 95°, 94°, 96°, 95°, 97°, and 95°, for the first, second, third, fourth, fifth, and sixth hour in the six-hour period, respectively. The values from samples 208 and inferences 210 that correspond to the first hour, second hour, and sixth hour from the six-hour period may undergo a comparison by the intelligent collector 200. After this comparison is made, all values from samples 208 may be stored in sample values 300, while all values in inferences 210 that are not compared to values in samples 208 may be stored in predictions 302.

In another example, samples 208 may include a data set of temperature measurements obtained over a period of 6 hours from two data collectors. These measurements may correspond to a sampling pattern that indicates that the first data collector is to be sampled during the first hour, the second sample is to be sampled during the second hour, the first data collector is to be sampled during the third hour, the second data collector is to be sampled during the fourth hour, the first data collector is to be sampled during the fifth hour, and the second data collector is to be sampled during the sixth hour. The resulting data set may include 92°, 94°, 92°, 95°, 92°, and 96°, for hours 1-6, respectively. Inferences 210 may include a data set of predictions pertaining to each hour in the six-hour period for each of these data collectors. These values may include, for the first data collector, 91°, 92°, 93°, 92°, 92°, and 91°, for hours 1-6, respectively, and, for the second data collector, 94°, 95°, 96°, 97°, 94°, and 94°, for hours 1-6, respectively. In this example, all of the samples may be stored in hybrid data 212. In contrast, only some of these inferences may be stored. For example, for the first data collector, there are measurements for hours 1, 3, and 5. Consequently, only inferences of 92°, 92°, and 910 (associated with hours 2, 4, and 6, respectively) may be stored as part of predictions 302. Similarly, for the second data collector, there are measurements for hours 2, 4, and 6. Consequently, only inferences of, 94°, 96°, and 940 (associated with hours 1, 3, and 5, respectively) may be stored as part of predictions. Accordingly, for the first data collector, hybrid data 212 may include values of 92°, 92°, 92°, 92°, 92°, and 910 (with the first, third, and fifth values being associated with measurements while the second, fourth, and sixth values being associated with inferences) for hours 1-6, respectively.

Figure 4A:
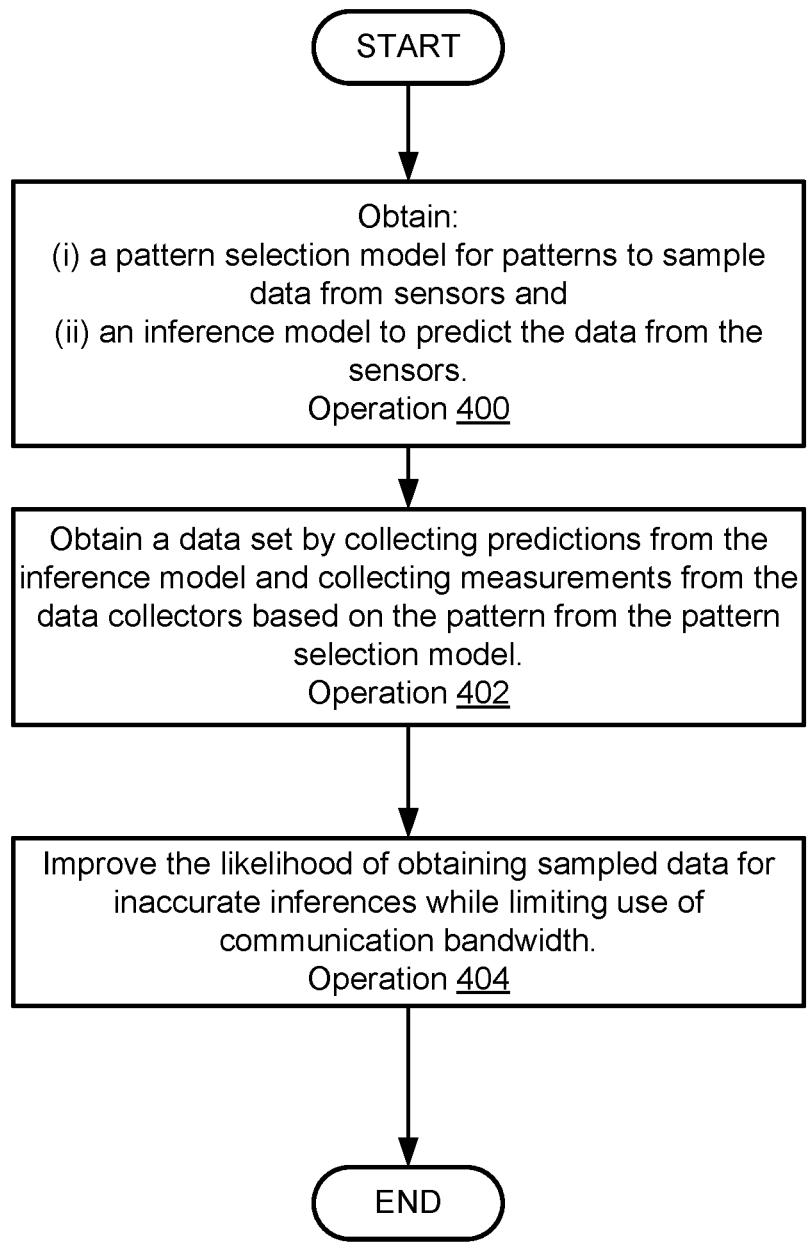
FIGS. 4A-4D shows a flow diagram illustrating methods of collecting data in a distributed system in accordance with an embodiment.

Turning to FIG. 4A, a flow diagram illustrating a method of improving the likelihood of obtaining sampled data for inaccurate inferences while limiting use of communication bandwidth in accordance with an embodiment is shown.

At operation 400, a pattern selection model to determine a sampling pattern for measurements and an inference model to predict data are obtained.

In an embodiment, the inference model may be obtained utilizing a machine learning model. The machine learning model may utilize training data obtained from any number of data collectors (e.g., data collectors), throughout a distributed system. The data aggregator may obtain the training data from the data collectors, via a communication system operably connecting the data collectors and the data aggregator.

After an inference model is generated based on a machine learning model, the inference model may then generate inferences that predict future measurements obtained by the data collectors without having access to the measurements obtained by the data collectors, allowing for less communication bandwidth as a measurement has no need for passage through the communication system for the generation of predictions.

In an embodiment, the pattern selection model may be obtained using a machine learning model that may utilize training data obtained by a data aggregator and inferences intended to match the training data and generated by the inference model. The pattern selection model may provide, as output, a sampling pattern adapted to identify differences between measurements obtained by data collectors and predictions (i.e., inferences) obtained by the inference model. While the training data has been described above as including a limited quantity and type of information, training data may include different types and quantity of data regarding various types of information without departing from embodiments disclosed herein. A pattern selection model in accordance with an embodiment may be based on fewer, additional, and/or different sources of data than those discussed herein.

At operation 402, a data set is obtained by collecting predictions from the inference model and collecting measurements from the data collectors based on the pattern from the pattern selection.

In an embodiment, the predictions from the inference model are obtained by providing input to the inference model, which may output inferences based on the input. The input to the inference model may include information similar to that used during training of the machine learning model, but for current/future points in time. For example, if the training data represents a relationship between past periods of time and measurements by a data collector, then the input to the inference model may be future periods of time for which the data collector measurement is unknown to the data aggregator. The resulting inferences (e.g., output of the machine learning model) may be similar to the corresponding measurements by the data collector.

In an embodiment, the measurements are collected from the data collectors by requesting them from the data collectors. The requests may be based on a sampling pattern obtained from the pattern selection model. The sampling pattern may indicate from which data collectors the measurements made by the data collectors are to be obtained and from which data collectors the measurements made by the data collectors are not to be obtained. The data aggregator may make such requests, for example, by sending communications to the data collectors, or via other methods of communication and/or control.

At operation 404, the likelihood of obtaining sampled data for inaccurate inferences is improved while limiting use of communication bandwidth.

In an embodiment, the likelihood of obtaining sampled data for inaccurate inferences is improved by updating the pattern selection model. Updating the pattern selection may change the sampling pattern to have a higher likelihood of selecting data collectors for which corresponding inferences regarding measurements are likely to be inaccurate.

The pattern selection model may be updated by, for example, making a comparison between inferences and obtained sample values using existing sampling patterns. The differences may indicate which data collectors the inference model is likely to provide accurate inferences. Consequently, a process of reinforced learning may be performed based on these differences to update the pattern selection model. However, the pattern selection model may be updated using different processes without departing from embodiments disclosed herein.

In an embodiment, if a difference between an inference and a corresponding measurement is within a threshold, the inference may be considered accurate. If the inference is accurate, the pattern selection model may be updated to increase the likelihood of identifying inaccurate inferences. If the inference is inaccurate, the pattern selection model may remain unchanged (or may only be subject to minor change).

Figure 4B:
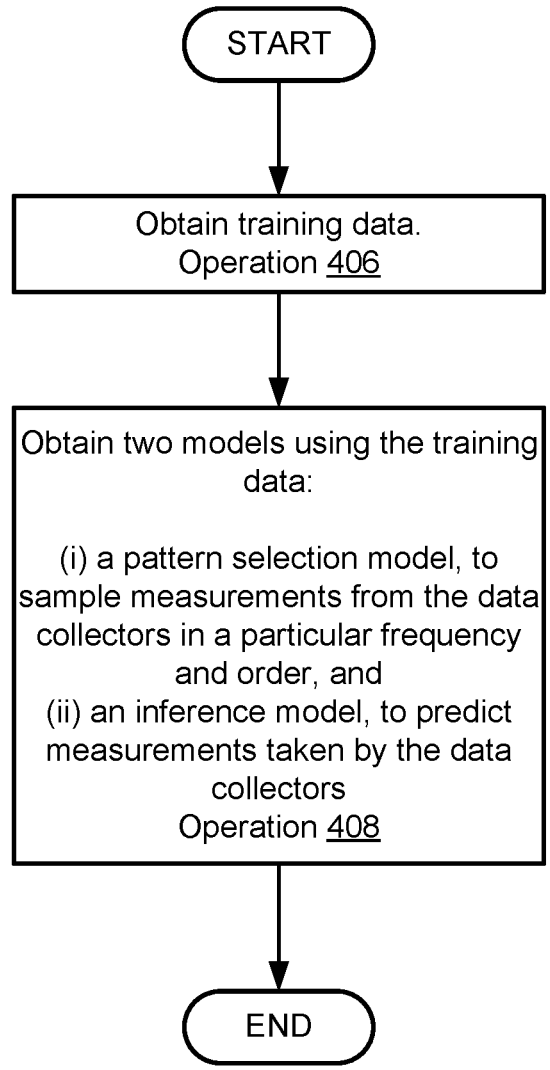

Turning to FIG. 4B, a flow diagram illustrating a method for obtaining training data, a pattern selection model, and/or an inference model in accordance with an embodiment is shown.

At operation 406, training data is obtained.

In an embodiment, the training data is obtained by collecting the training data from data collectors of the system and which the data aggregator may use to train one or more inference models and/or pattern selection models. For example, the intelligent collector may obtain primary sample values (e.g., sample values specifically for use as training data) from data collectors and store them as training data. The primary sample values may include one or more pieces of data obtained by the data collectors that establish a relationship which may be used to train an inference model and/or pattern selection model. With these primary sample values, one or more machine learning methods may be implemented to further utilize the training data.

In an embodiment, the training data is from another entity. For example, another device (e.g., computing device, data storage device, etc.) may obtain and/or store a copy of the training data. The training data may be obtained by requesting, reading, and/or otherwise obtaining the training data from the other entity. The training data may include preset values in the form of tables, charts, graphs, lists, etc., and may also have predetermined correlations (e.g., time-value relationships or other types of relations) stored as data sets.

At operation 408, the training data (all or a portion) is used to obtain: (i) a pattern selection model, to sample measurements from the data collectors in a particular frequency and order, and (ii) an inference model, to predict measurements taken by the data collectors.

In an embodiment, the data aggregator obtains an inference model and a pattern selection model. The inference model and a pattern selection model may be obtained by being generated by the data aggregator using the training data. For example, the training data may be fed into one or more predictive algorithms including, but not limited to, artificial neural networks, decision trees, support-vector machines, regression analysis, Bayesian networks, and/or genetic algorithms to generate one or more inference models and/or pattern selection models. The inference models and pattern selection models may be generated via other methods without departing from embodiments disclosed herein.

In an embodiment, the obtained inference model and/or pattern selection are adapted to be refined over time. For example, the training process used to obtain the models may be performed again to refine these models. Additional training data, obtained after the initial training may be used to retrain or otherwise update the operation of the inference model and/or pattern selection model. Consequently, as the models become less able to perform their operations (e.g., to data drift of the measurements performed by the data collectors), they may be updated using more recent training data. Refer to FIG. 4D, operations 424-428, for additional details regarding model refinement.

In an embodiment, the data aggregator obtains an inference model and a pattern selection model from another entity through a communication system. For example, the data aggregator may request the models from the other entity, and the other entity may respond by providing them to the data aggregator.

The method may end following operation 408.

Figure 4C:
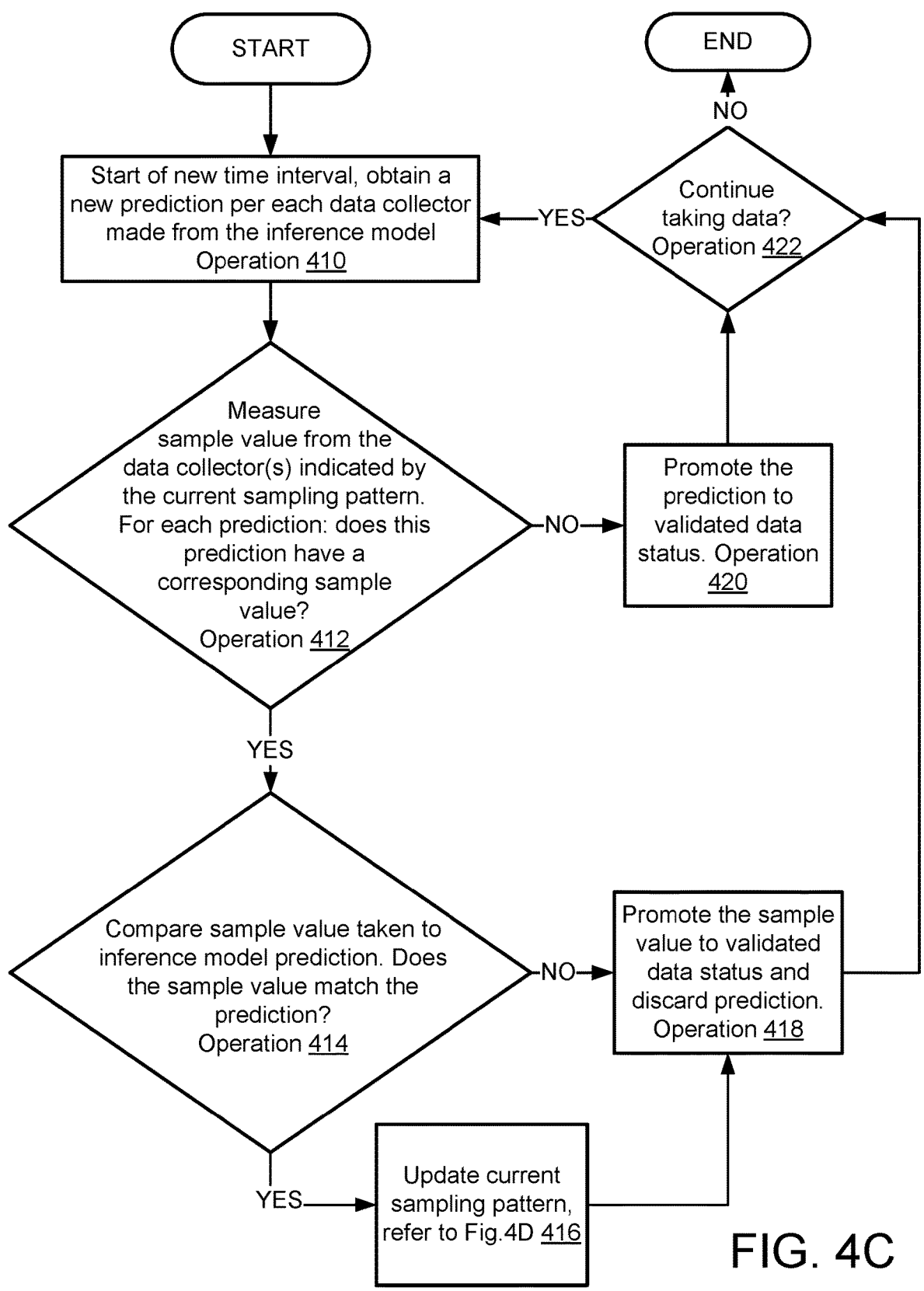
Figure 4D:
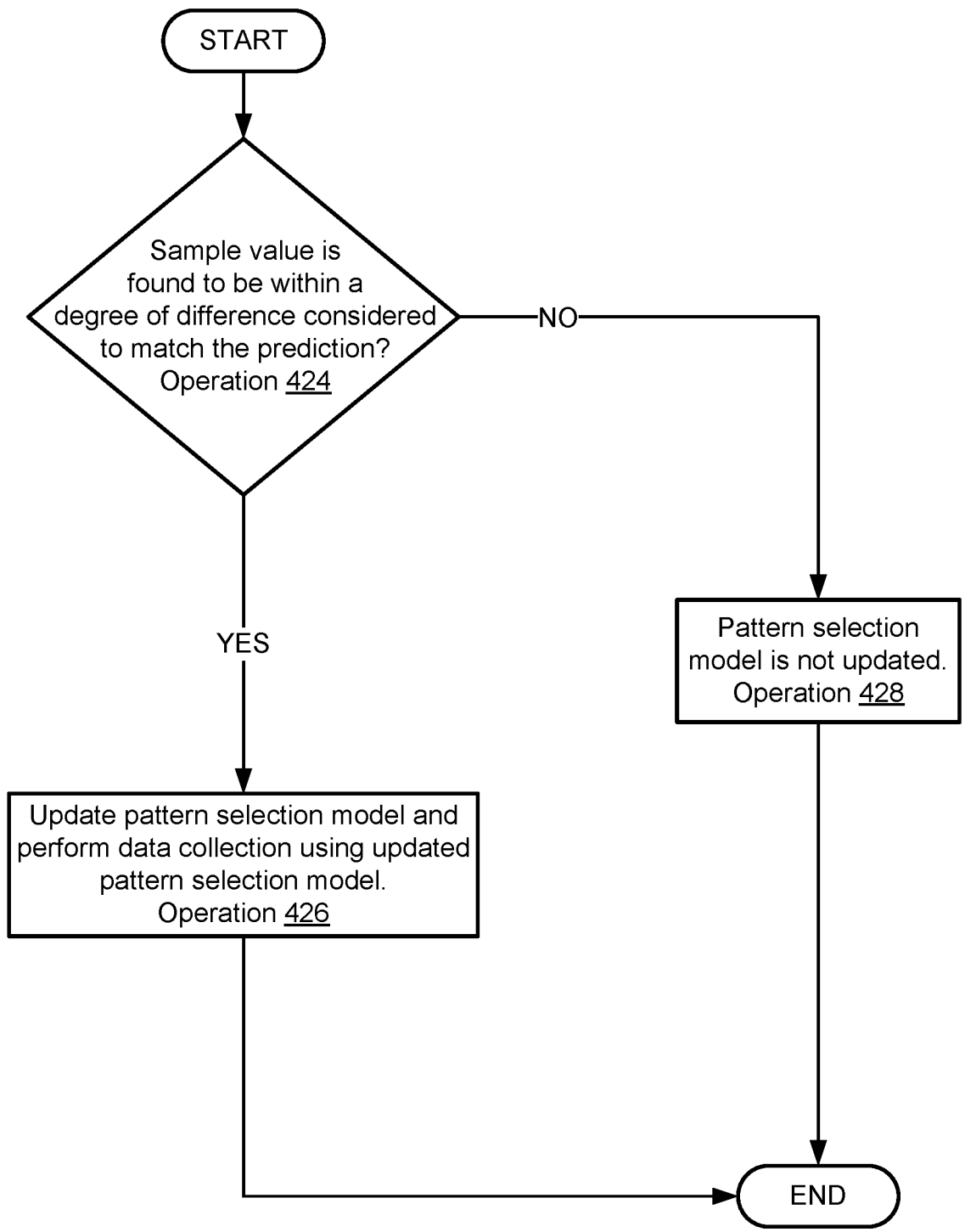

Turning to FIG. 4C, a flow diagram illustrating a method for collecting data from data collectors in accordance with an embodiment is shown. In an embodiment, data is collected with respect to time. The method illustrated in FIG. 4C may be performed with respect to different time intervals thereby allowing data corresponding to different periods of time to be obtained.

At operation 410, at the start of a new time interval, a new prediction for each data collector is obtained based on an inference model. In an embodiment, the prediction is obtained utilizing machine learning and based on the training data (e.g., a trained inference model). For example, the trained inference model may take, as input, a period or point in time (e.g., that associated with the new time interval) and generate, as output, a prediction of a data collector measurement. This process may be repeated for any number of data collectors to obtain predictions of the measurements of any number of data collectors during the new time interval. The prediction may be obtained via other methods without departing from embodiments disclosed herein.

At operation 412, sample values from the data collector(s) are measured, as indicated by the current sampling pattern. The sampling pattern may indicate the frequency and sequence of data collection. Accordingly, the intelligent collector may collect sample values based on the sampling model which may specify a specific data collector from which measurements will be obtained during the new time interval.

The intelligent collector may sequentially verify, based on the sampling pattern, whether each data collector within the system will, or will not, provide measured data within the new time interval, and then collect the sample values from the data collectors verified to be sampled during the new time interval. These sample values may be stored in a data structure to be utilized in the future, as discussed below. Consequently, samples values for only a portion of the predictions obtained in operation 410 may be obtained.

In an embodiment, it is determined whether, for each prediction, a corresponding sample value has been obtained. For example, to determine whether a sample value has been obtained for a prediction, sample values stored in samples 208 may be compared to the inferences stored in inferences 210. Each of these data structures may include metadata indicating associations between the sample values and corresponding data collectors, as well as the inferences and corresponding data collectors. Accordingly, for a given sample value, an identity of a data collector associated with the sample may be known. The identity of the data collector may be compared to the data collectors associated with the inferences. If the identity of the data collector matches one of the data collectors associated with the inferences, then it may be determined that a sample value corresponds to the prediction.

If a prediction corresponds to a sample value, then the method may proceed to operation 414 following operation 412. Otherwise, the method may proceed to operation 420 following operation 412.

At operation 414, the sample value(s) taken (e.g., in operation 412) is compared to inference model prediction(s).

In an embodiment, the comparison may be performed by the intelligent collector. The comparison may indicate whether a difference between a prediction and a corresponding sample value is within a threshold. If the difference is within the threshold, then the prediction may be treated as being accurate, and may be treated as a match even though there may be some degree of difference between the sample value and the prediction. If the difference is not within the threshold, then the prediction may be treated as being inaccurate, and the sample value and prediction may be treated as not matching.

In an embodiment, it is determined whether, for each prediction, a corresponding sample value matches the prediction. For example, to determine whether a sample value matches a corresponding prediction, sample values stored in samples 208 may be compared to the inferences stored in inferences 210, as noted above. Each of these data structures may include metadata indicating associations between the sample values and corresponding data collectors, as well as the inferences and corresponding data collectors. The sample value obtained from the data collector may be compared to the prediction for the data collector measurement. To do so, lookup, based on an identity of a given data collector, may be performed using the samples 208 and inferences 210 to obtain the corresponding prediction and sample value.

If a prediction for the data collector measurement matches the corresponding sample value from the data collector, then it may be determined that the prediction is accurate. If prediction for the data collector measurement does not match the corresponding sample value from the data collector, then it may be determined that the prediction is inaccurate. Similar to that described with respect to operation 412, the match may be determined based on thresholds that allow for a sample value to be treated as matching an inference even when there is some degree of difference between the sample value and the corresponding prediction.

If a prediction matches a sample value, then the method may proceed to operation 416 following operation 414. Otherwise, the method may proceed to operation 418 following operation 414.

At operation 416, the current sampling pattern is updated. The current sampling pattern may be updated to increase the likelihood that the updated sampling pattern will obtain sample values from data collectors for which inaccurate predictions are being made, and reduce the likelihood that the updated sampling pattern will obtain sample values from data collectors for which accurate predictions are being made.

In an embodiment, the sample pattern is updated using the method illustrated in FIG. 4D. The sampling pattern may be updated via other methods without departing from embodiments disclosed herein.

At operation 418, the sample value may be promoted to validated data and the predictions corresponding to the samples values may be discarded.

In an embodiment, the samples values are promoted by storing the sample values as hybrid data 212. For example, as illustrated in FIG. 3, hybrid data 212 may include sample values 300 for which corresponding predictions were obtained but are not stored in hybrid data 212.

When storing the sample values in hybrid data 212, the sample values 300 may be associated with data collectors from which the sample values were obtained. Additionally, the sample values in hybrid data 212 may be associated with points or periods of time. Consequently, sample values 300 may include different sample values for a given data collector at different points or periods of time.

In an embodiment, the predictions are discarded by deleting the predictions from inferences 210.

Returning to operation 412, if a prediction has no corresponding sample value, then the method may proceed to operation 420 following operation 412.

At operation 420, the prediction is promoted to validated data status. For example, when the method proceeds to operation 420 following operation 412, no sample value corresponding to the prediction may be obtained. Consequently, to obtain a complete data for a data collector, the prediction may be treated as being accurate and may be automatically promoted to validated data.

In an embodiment, the prediction is promoted by storing the prediction as hybrid data 212. For example, as illustrated in FIG. 3, hybrid data 212 may include predictions 302 for which corresponding sample values were not obtained, but the predictions are stored in hybrid data 212 so that a full data set for all time periods for a data collector may be obtained even though only sample values corresponding to a portion of the time periods are actually obtained.

For example, when there is no sample value corresponding to a prediction, then the prediction may be promoted to validated data by the intelligent collector. The intelligent collection may promote data by changing the location of where that data is stored. The intelligent collector may change the prediction without a corresponding sample value from being stored in inferences 210 to predictions 302 within hybrid data 212.

After data from samples 208, and (all, or a portion of) data from inferences 210 may be promoted to validated data, then the method may proceed to operation 422 following operation 418, or following operation 420.

At operation 422, it is determined whether data from the data collectors will continue to be taken. The determination may be made, for example, based on a current point in time and a predetermined duration during which data is to be obtained from the data collector, feedback from a user (e.g., data collection may continue until a user indicates that the data collection is to stop), and/or via other methods.

If it is determined that data is to continue to be obtained, then the method may proceed to operation 410 following operation 422. Otherwise, the method may end following operation 422.

Turning to FIG. 4D, a flow diagram illustrating a method of updating a pattern selection model to increase the likelihood that the updated sampling pattern will obtain sample values from data collectors for which inaccurate predictions are being made in an embodiment is shown.

At operation 424, a determination may be made regarding whether a sample value is found to be within a degree of difference considered to match the prediction.

In an embodiment, the intelligent collector makes a determination regarding whether the difference between a prediction and sample value are within a threshold. For example, similar to that described with respect to operation 414, the match may be determined based on thresholds that allow for a sample value to be treated as matching an inference even when there is some degree of difference between the sample value and the corresponding prediction.

If a prediction does not match a corresponding sample value, then the method may proceed to operation 428 following operation 424. Otherwise, the method may proceed to operation 426 following operation 424.

Additionally, the difference between the sample value and the prediction may be used to facilitate reinforced learning of the pattern selection model. For example, an objective function may be used that provides a value indicating the desirability of various patterns. The objective function may indicate that sampling patterns that identify larger differences between predictions and sample values are more desirable than sampling patterns that identify smaller differences between the predictions and sample values. Thus, the difference determined here may be used in conjunction with other differences to identify a relative desirability of the sampling pattern with which the sample value was obtained. The desirability of the sample patterns may be used by the reinforced learning process to update the pattern selection model.

In addition to the differences between predictions and sample values, the objective function may also take into account other factors regarding the desirability of sampling various data collectors. For example, the relative energy consumption for sampling, communication bandwidth for sampling, relative capabilities of the data collectors, and/or other factors may be used to drive the objective function. Consequently, while the reinforced learning process may be used to direct sampling towards data collectors for which inaccurate predictions are generated, the sampling may be directed toward various data collectors for other reasons. For example, an objective function may take, as input, the difference for each sample of a sample pattern, and the power consumption for obtaining the sample values used to obtain the differences. The objective function may weigh the power consumption similarly to the differences such that data collectors that require little energy to sample are more frequently sampled when compared to other data collectors that require more energy to sample, but for which predictions of similar accuracy are generated.

In another example, the objective function may also take into account prediction uncertainties of the predictions used to obtain the differences. For example, the objective function may take prediction uncertainties as input along with the differences. The objective function may heavily weight the prediction uncertainties such that the objective function tends to indicate that it is desirable to sample data collectors for which predictions of sample values are likely to be less accurate. By doing so, the reinforced learning may result in the updated pattern selection model generating sampling patterns that tend to sample those data collectors more frequently.

At operation 426, the data aggregator may update the pattern selection model and perform data collection using the updated pattern selection model.

In an embodiment, the pattern section model is updated utilizing machine learning such as, for example, Gaussian process regression, decision trees, logistic regression, etc. The machine learning method used may priorities reducing the likelihood that the updated sampling pattern will obtain sample values from data collectors for which accurate predictions are being made.

In an embodiment, the pattern selection model may be updated via reinforced learning. The reinforced learning may modify an already trained machine learning model based on addition data (e.g., beyond that used in initial training and/or previous updating). The reinforced learning may modify the pattern selection model in a manner that results in the updated pattern selection model providing updated sampling patterns that are less likely to indicate that sample values from data collectors for which accurate predictions are being made are to be obtained. In other words, the reinforced learning may reinforce generation of sampling patterns that preferentially sample data collectors for which inaccurate predictions are being made.

The sampling pattern may be updated via other methods without departing from embodiments disclosed herein. For example, additional training data, obtained after the initial training may be used to retrain or otherwise update the pattern selection model. The more recent training data may be obtained from recent sample values and predictions.

At operation 428, the pattern selection model is not updated. In other words, the pattern selection model may be treated as effectively generating sampling patterns that are likely to cause sample values from data collectors for which inaccurate predictions are being generated are obtained. Consequently, in contrast to operation 426, data collection using the existing pattern selection model may continue to be performed.

In an embodiment, while the predictions remain inaccurate with respect to the corresponding sample values, the pattern selection model is not updated, as the pattern selection model is trained to sample data collectors associated with inaccurate predictions.

The method may end following operations 426 or 428.

Turning to FIGS. 5A-5J, these figures may illustrate a system similar to that of FIG. 1 in accordance with an embodiment. FIGS. 5A-5J may show actions performed by the system over time. The system may include thermal sensor A 510, thermal sensor B 520, and thermal manager 500. Thermal sensor A 510 and thermal sensor B 520 may be operably connected to thermal manager 500 via communication system 550. Communication system 550 may include limited communication bandwidth and may serve a large number of different components (not shown). Consequently, it may be desirable to limit communications between the thermal sensors and thermal manager 500 to efficiently marshal the limited communication bandwidth so that it is less likely that components of the system are impaired for lack of access to communication bandwidth.

Figure 5A:
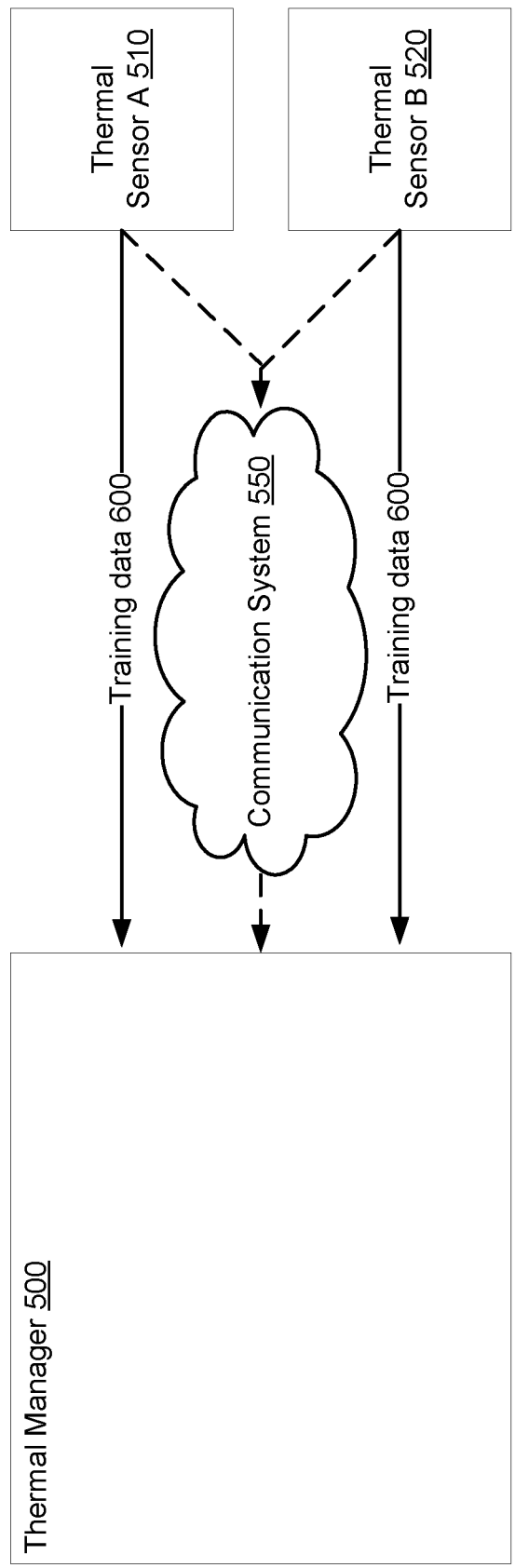
FIGS. 5A-5J show diagrams illustrating a system in accordance with an embodiment over time.

Turning to FIG. 5A, consider a low-density data center. Temperature may be extensively monitored at data centers because fluctuations of temperature in equipment can cause rapid and catastrophic failures to a system, and may be costly to repair and/or replace. The system may monitor the temperatures within a system to select actions to be performed to reduce the likelihood of failures of the system. If the temperatures inside the system are outside of operational requirements (e.g., some places in an enclosure in which temperature sensitive components may be located may be too hot or too cold), then the system may change air flow through the enclosure, redistribute power to different components, completely shut down the system, alert engineers of problem areas needing immediate attention, and/or perform other actions to address the potential failure of these components/system.

One way to monitor temperature may be to have sensors placed in the back of a data rack to monitor air temperature leaving the enclosure and entering the enclosure, with normal operating temperatures being between 64° F.-80° F. for air temperature leaving the enclosure, and under 35° F. for air temperature entering the enclosure.

Turning to FIG. 5A, to do so, the thermal manager may collect temperature data from the thermal sensors where thermal sensor A 510 and thermal sensor B 520 may collect training data 600 from the back of an enclosed server rack at a low-density data center. Thermal sensor A 510 may be placed to measure air temperature leaving the rack, and thermal sensor B 520 may be placed to measure air temperature entering the rack. Training data 600 may be collected at a time interval (e.g., $t_1$, $t_2$, etc.) every thirty minutes over the course of three hours, by each thermal sensor, and may include the following: $t_1$=75° F., $t_2$=70° F., $t_3$=72° F., $t_4$=65° F., $t_5$=69° F., $t_6$=80° F., from thermal sensor A 510, and $t_1$=35° F., $t_2$=30° F., $t_3$=32° F., $t_4$=25° F., $t_5$=39° F., $t_6$=34° F., from thermal sensor B 520. Thermal data collector 500 may obtain training data 600 for the purpose of training an inference model to predict future measurements of temperature obtained by thermal sensor A 510 and thermal sensor B 520.

Figure 5B:
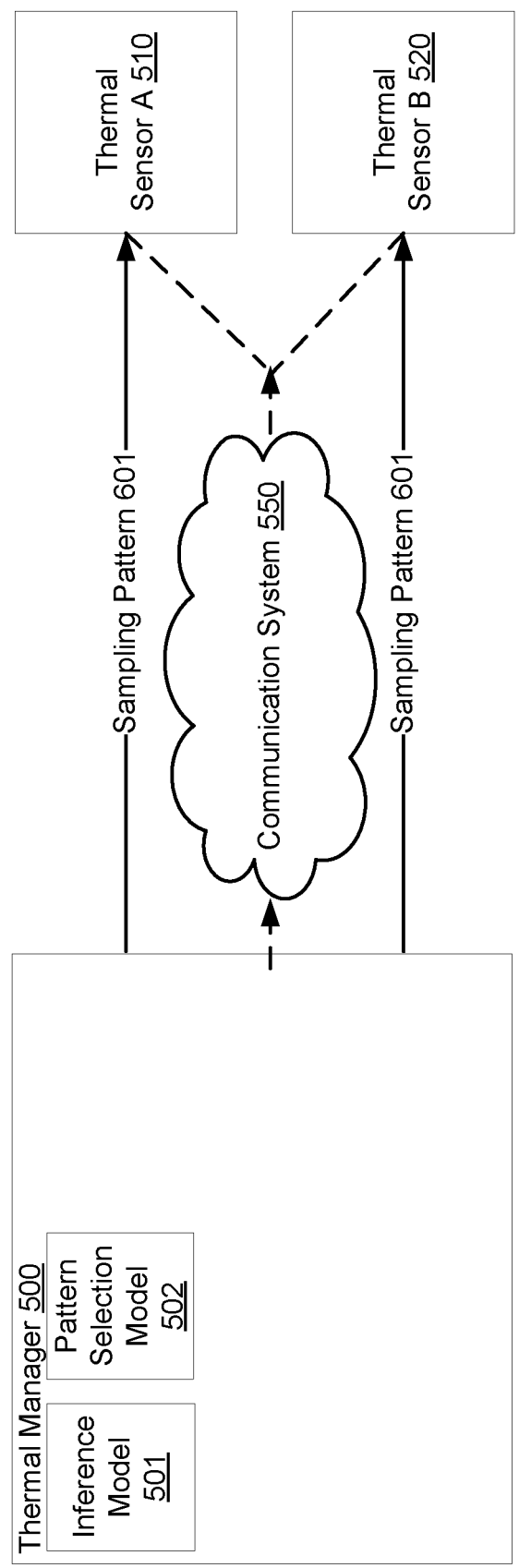

Thermal manager 500 may utilize training data 600 to obtain an inference model and a pattern selection model. Turning to FIG. 5B, for example, thermal manager 500 may perform portions of the methods illustrated in FIGS. 4A and 4B to obtain inference model 501 and pattern selection model 502. Using pattern selection model 502, thermal manager 500 may communicate a sampling pattern 601 to thermal sensor A 510 and thermal sensor B 520. Sampling pattern 601 may hold instructions on a frequency and sequence for which thermal sensor A 510 and thermal sensor B 520 may communicate measurements of the air temperature leaving and entering the rack, respectively, to the thermal manager 500.

Figure 5C:
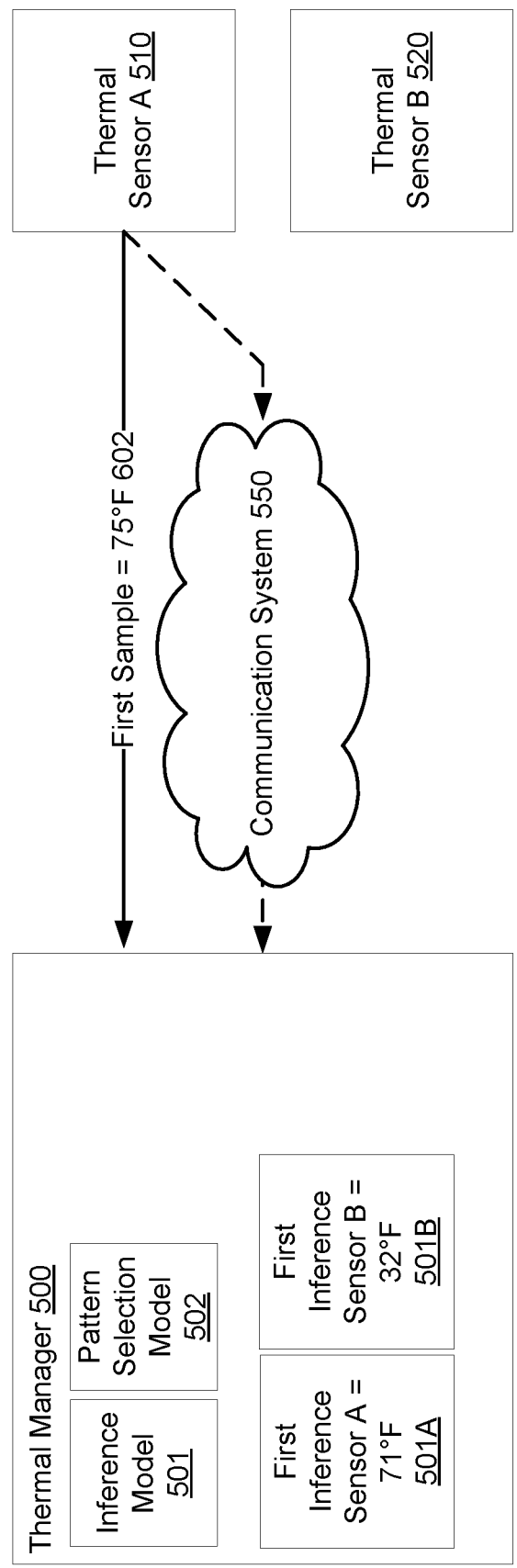

The method of data collection by the thermal manager 500, as illustrated in FIG. 4C, may be performed with respect to different time intervals thereby allowing data corresponding to different periods of time to be obtained. Turning to FIG. 5C, data collection may begin at the start of a time interval, and a prediction, based on the inference model 501, may be obtained for each thermal sensor for the first period of time. The predictions may include the following: First Inference 501A=71° F. as the prediction for thermal sensor A 510, and First Inference 501B=32° F. as the prediction for thermal sensor B 520. Simultaneously, the thermal sensors may communicate measurements of temperature (e.g., sample values) to the thermal manager 500, based on instruction from the previously received sampling pattern 601. The sampling pattern 601 may have instructions for thermal sensor A 510 to communicate first sample 602=75° F. to the thermal manager 500 during the first period of time, and thermal sensor B 520 to not communicate a measurement of temperature to the thermal manager 500 during the first period of time.

As stated previously, it may be desirable to limit communications between the thermal sensors and thermal manager 500 to efficiently marshal the limited communication bandwidth and efficiently manage power consumption by various components, so that it may be less likely that components of the system are impaired for lack of access to communication bandwidth or impaired for lack of power. To do so, thermal manager 500 may utilize reinforced learning to update the pattern selection model 502 to increase the likelihood of collecting sample values corresponding to inaccurate predictions. For example, as accurate predictions are made, the predictions may be sufficient to be used as though they were measurements of temperature from the thermal sensors, and thermal sensors may not need to communicate corresponding sample values because accurate data may already be acquired based on the predictions. Sample values may need to be collected when there is an increased likelihood of a prediction being inaccurate, as to maintain accurate data for the temperature in the rack enclosure.

Figure 5D:
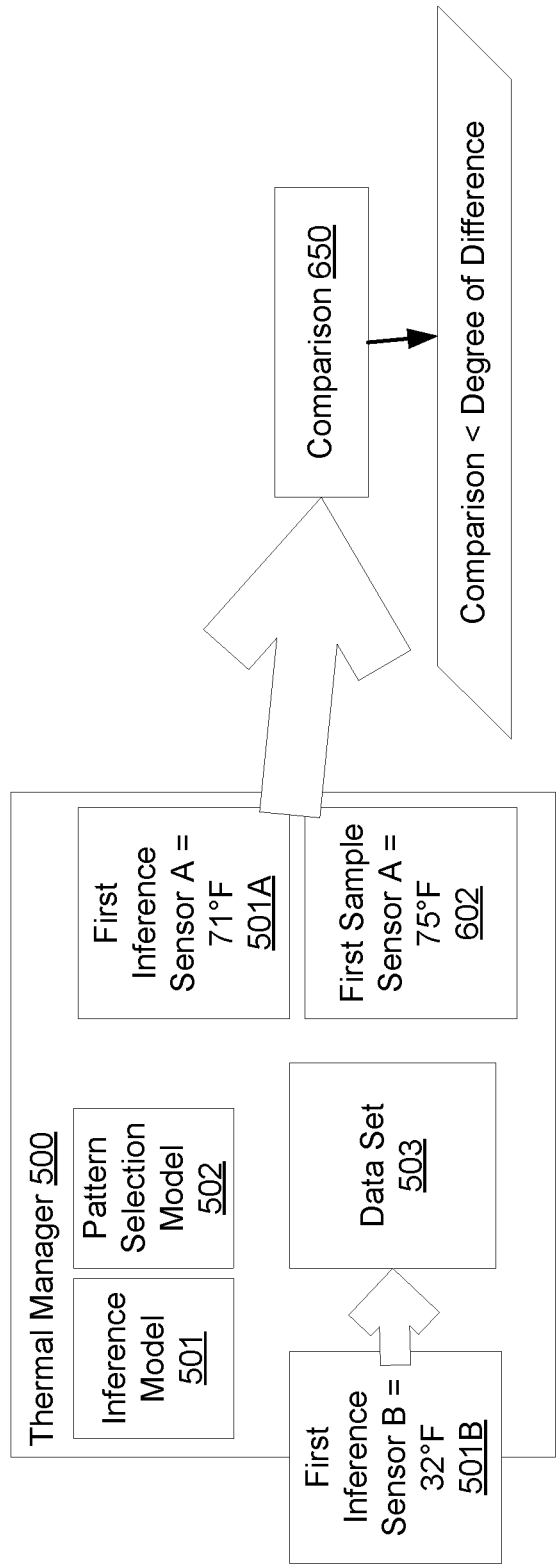

The thermal manager 500 may update the pattern selection model 502 when sample values match corresponding predictions, because collecting a sample value corresponding to an accurate prediction may be redundant for the data collection of the system (or otherwise provide no discernable advantage). Turning to FIG. 5D, to do so, thermal manager 500 may make a comparison 650 in order to determine whether a prediction from inference model 501 and a corresponding sample value from a thermal sensor may, or may not, match. For example, there may be a predetermined threshold for a degree of difference equal to 7% (or a different value/range). The thermal manager 500 may assign a value to the comparison 650 based on obtaining a percent difference (e.g., the absolute value of (prediction−sample value)/sample value*100)) between a prediction and corresponding sample value. The comparison 650 between first inference 501A and first sample 602 may be assigned a percent difference equal to 5.3%, which is less than the predetermined threshold of 7%, and allows a determination that the prediction and corresponding sample value match. Simultaneously, during the comparison 650, first inference 501B may be stored in data set 503 because first inference 501B has no corresponding sample value.

Figure 5E:
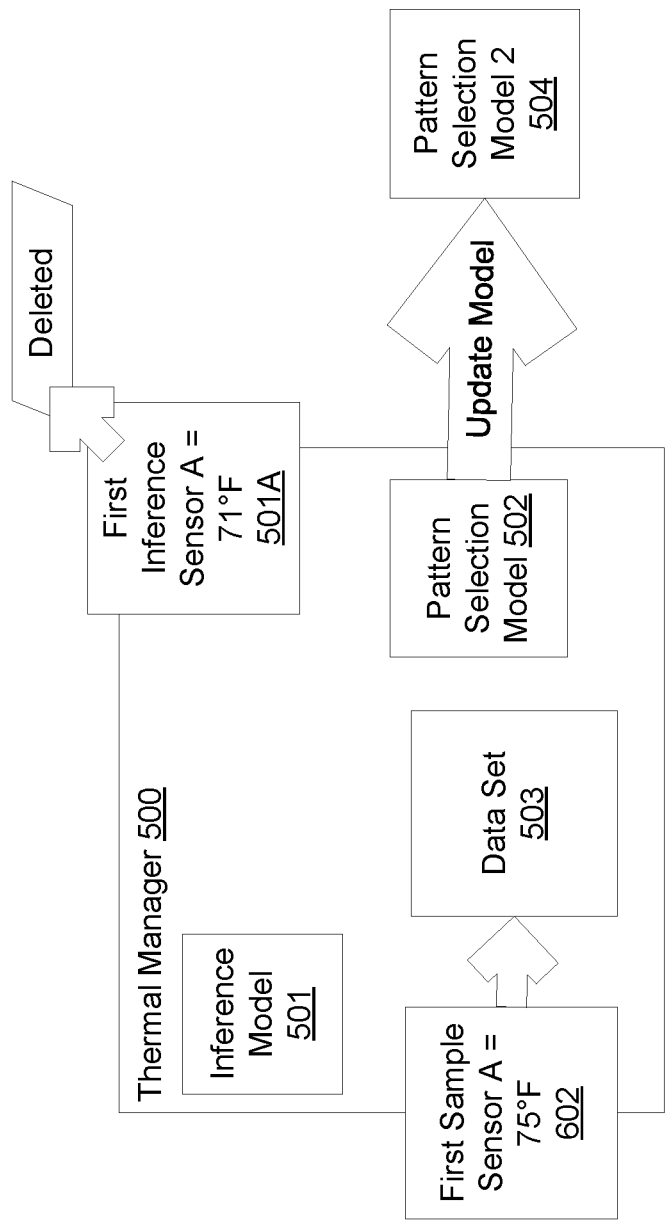

Turning to FIG. 5E, thermal manager 500 may store first sample 602 in data set 503 and may delete first inference 501A in order to be efficient and not store redundant data. First sample 602 may be chosen over first inference 501A because first sample 602 is a measurement of temperature from thermal sensor A 510 and may be more accurate than first inference 501A, despite first sample 602 and first inference 501A matching. Simultaneously, thermal manager 500 may update pattern selection model 502 to pattern selection model 2 504, to be used as new instructions on a frequency and sequence for which thermal sensor A 510 and thermal sensor B 520 may communicate measurements of the air temperature leaving and entering the rack, respectively, to the thermal manager 500.

Figure 5F:
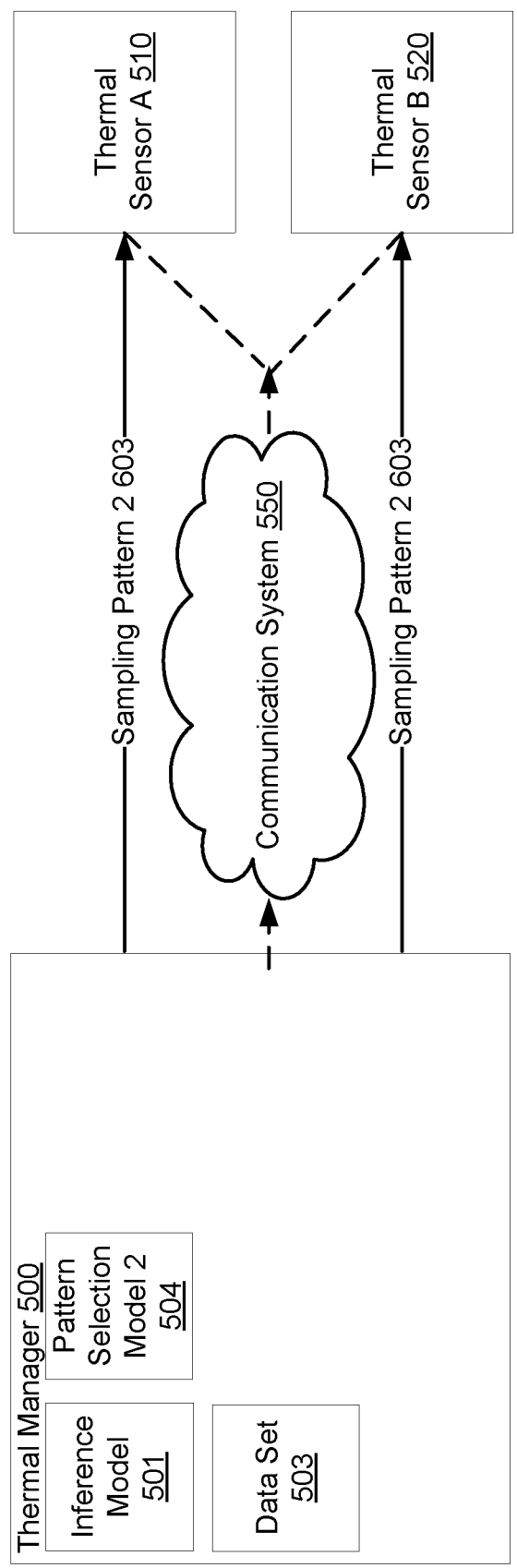

Turning to FIG. 5F, thermal manager 500 may communicate instructions from sampling pattern 2 603 based on pattern selection model 2 504 for the thermal sensors to use during the following period of time within the current time interval.

Figure 5G:
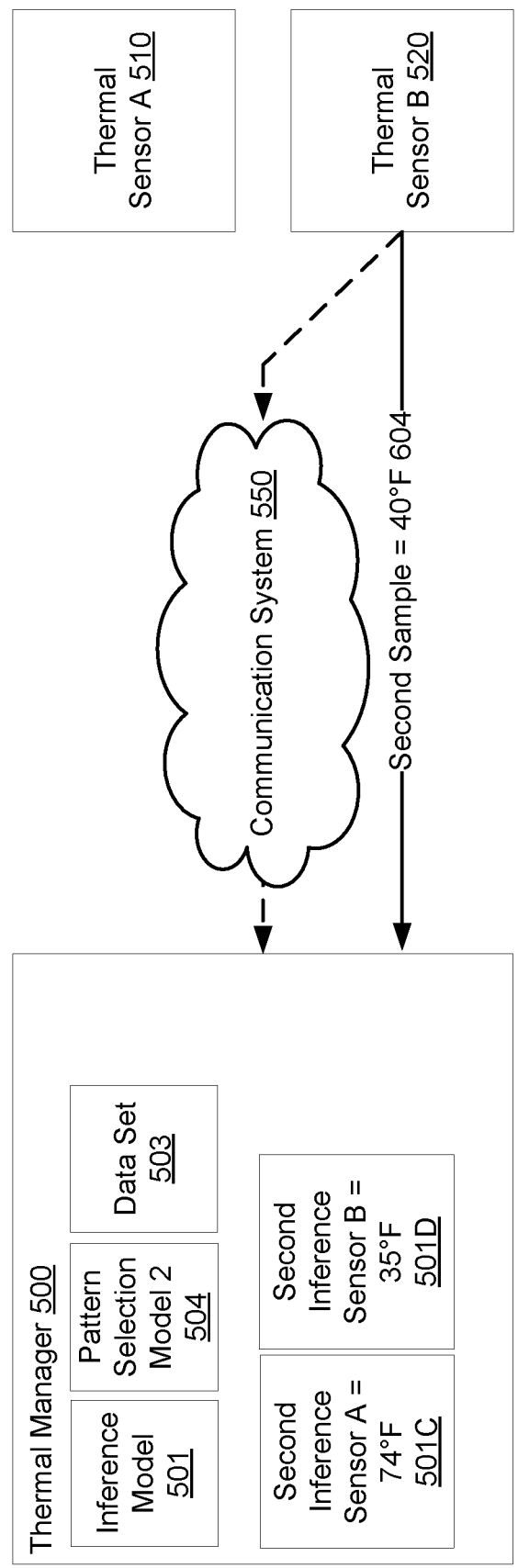

Turning to FIG. 5G, a prediction, based on the inference model 501, may be obtained for each thermal sensor for the second period of time. The predictions may include the following: second inference 501C=74° F. as the prediction for thermal sensor A 510, and second inference 501D=35° F. as the prediction for thermal sensor B 520. Simultaneously, the thermal sensors may communicate measurements of temperature (e.g., sample values) to the thermal manager 500, based on instruction from the previously received sampling pattern 2 603. The sampling pattern 2 603 may have instructions for thermal sensor B 520 to communicate second sample 604=40° F. to the thermal manager 500 during the second period of time within the time interval, and thermal sensor A 510 to not communicate a measurement of temperature to the thermal manager 500 during the second period of time within the time interval.

Figure 5H:
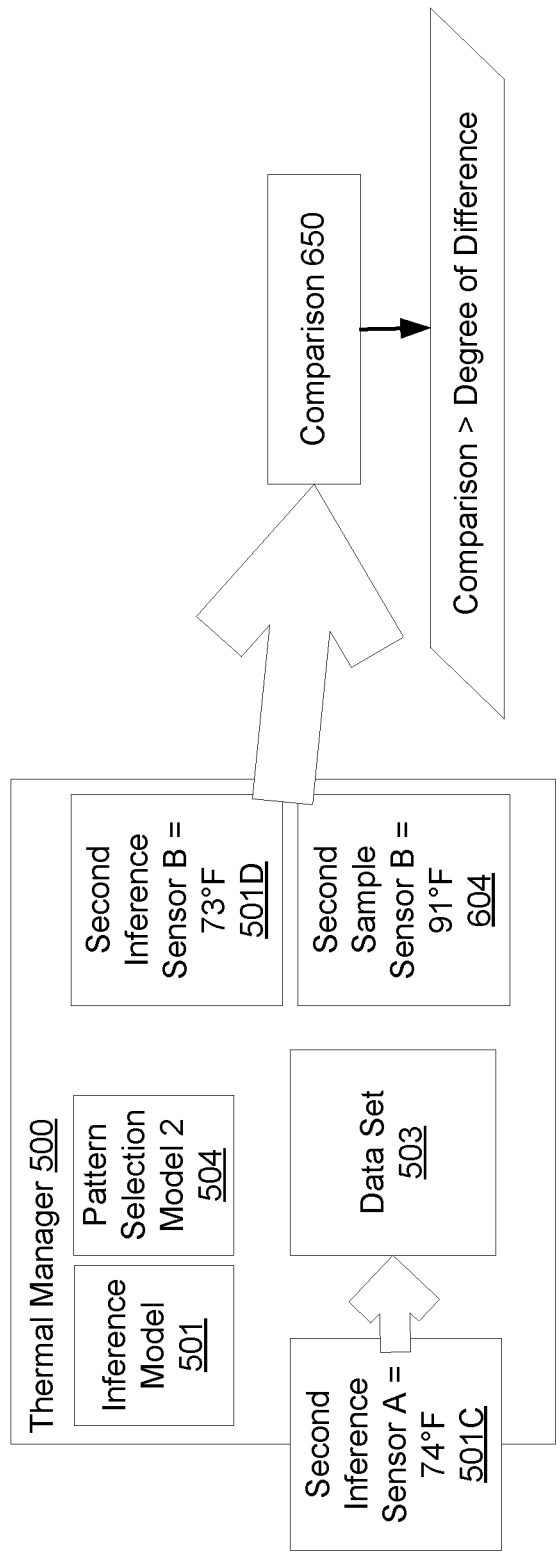

As illustrated previously in FIG. 5D, thermal manager 500 may make a comparison 650 in order to determine whether a prediction from inference model 501 and a corresponding sample value from a thermal data collector may, or may not, match. For example, there may be a predetermined threshold for a degree of difference equal to 7%. The thermal manager 500 may assign a value to the comparison 650 based on obtaining a percent difference (e.g., the absolute value of (prediction−sample value)/sample value*100)) between a prediction and corresponding sample value. Turning to FIG. 5H, the comparison 650 between second inference 501D and second sample 604 may be assigned a percent difference equal to 19.8%, which is more than the predetermined threshold of 7%, and allows a determination that the prediction and corresponding sample value do not match. Simultaneously, during the comparison 650, second inference 501C may be stored in data set 503 because second inference 501C has no corresponding sample value.

Figure 5I:
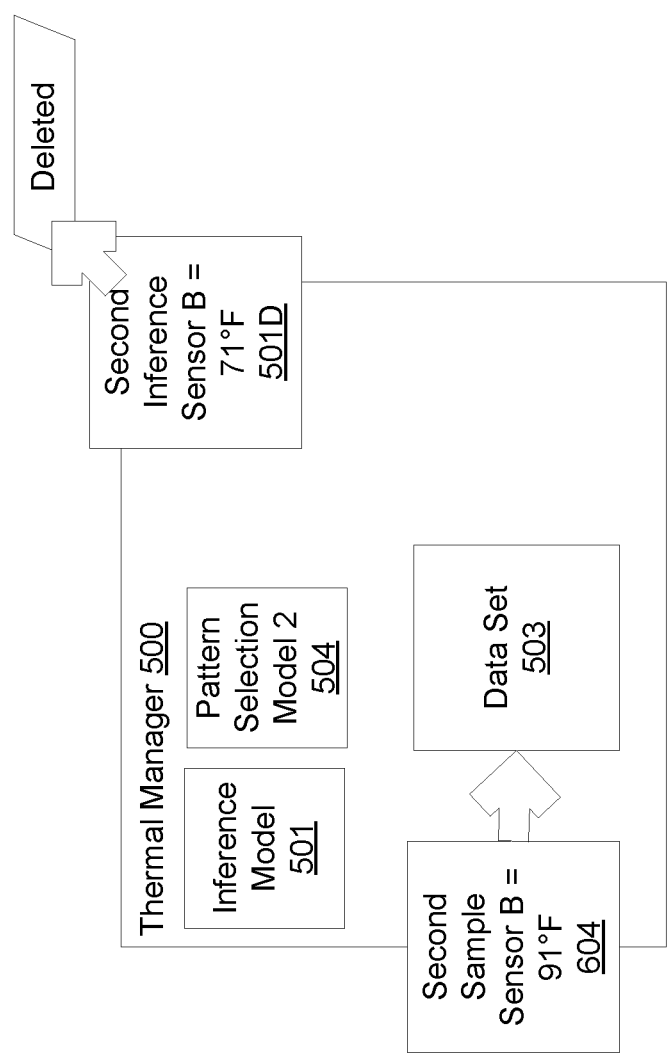

Turning to FIG. 5I, thermal manager 500 may store second sample 604 in data set 503 and may delete second inference 501D. Second sample 604 may be chosen over second inference 501D because second sample 604 is a measurement of temperature from thermal sensor A 510 and may be more accurate than second inference 501A. Simultaneously, thermal manager 500 may determine to not update pattern selection model 2 504, as the current instructions on a frequency and sequence for which thermal sensor A 510 and thermal sensor B 520 may communicate measurements of the air temperature leaving and entering the rack, respectively, to the thermal manager 500 may be increasing the likelihood of obtaining sampled data for inaccurate inferences as is, thereby reinforcing the use of pattern selection model 2 504.

The methods illustrated in FIGS. 5B and 5F where the sampling patterns are communicated to the thermal sensors by thermal manager 500 may not occur. As illustrated in FIG. 5F, the thermal sensors may already have instructions on how to sample data based on sampling pattern 2 603, which may be based on pattern selection model 2 504 which may not have been updated by thermal manager 500.

Figure 5J:
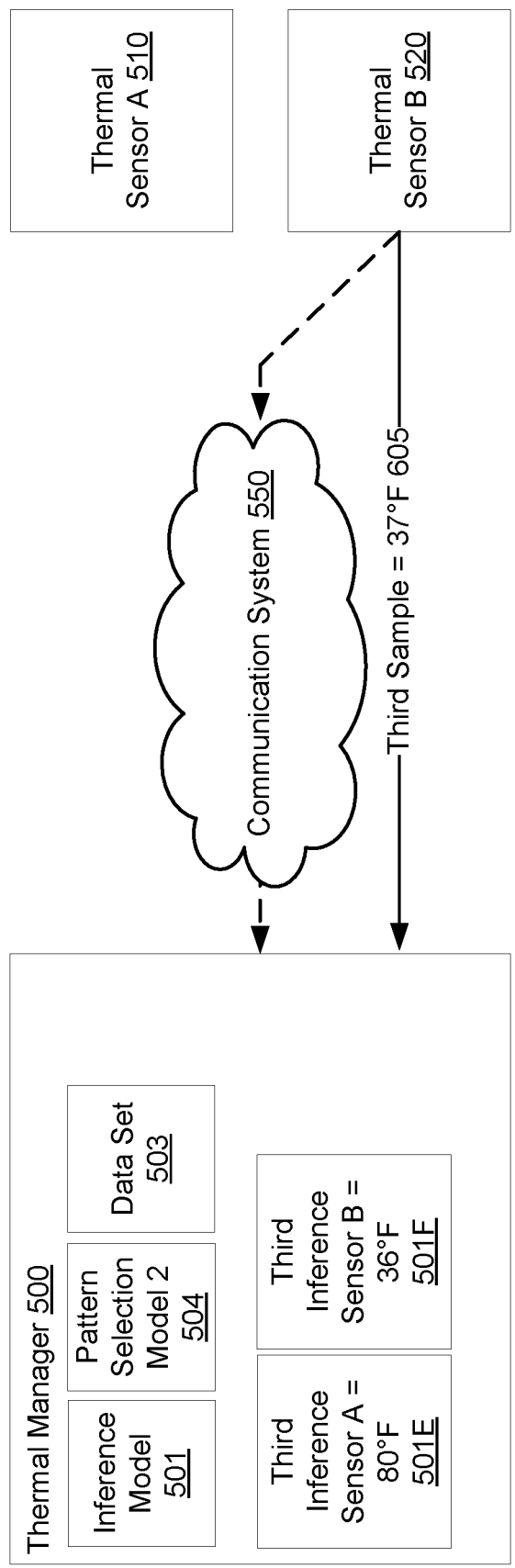

Turning to FIG. 5J, a prediction, based on the inference model 501, may be obtained for each thermal sensor for the third period of time. The predictions may include the following: third inference 501E=80° F. as the prediction for thermal sensor A 510, and third inference 501F=36° F. as the prediction for thermal sensor B 520. Simultaneously, the thermal sensors may communicate measurements of temperature (e.g., sample values) to the thermal manager 500, based on instruction from the previously received sampling pattern 2 603. The sampling pattern 2 603 may have instructions for thermal sensor B 520 to communicate third sample 605=37° F. to the thermal manager 500 during the third period of time, and thermal sensor A 510 to not communicate a measurement of temperature to the thermal manager 500 during the third period of time.

The system and actions shown in FIGS. 5A-5J may provide for intelligent data collection, allowing for efficient use of power and communication bandwidth in a distributed system.

Figure 6:
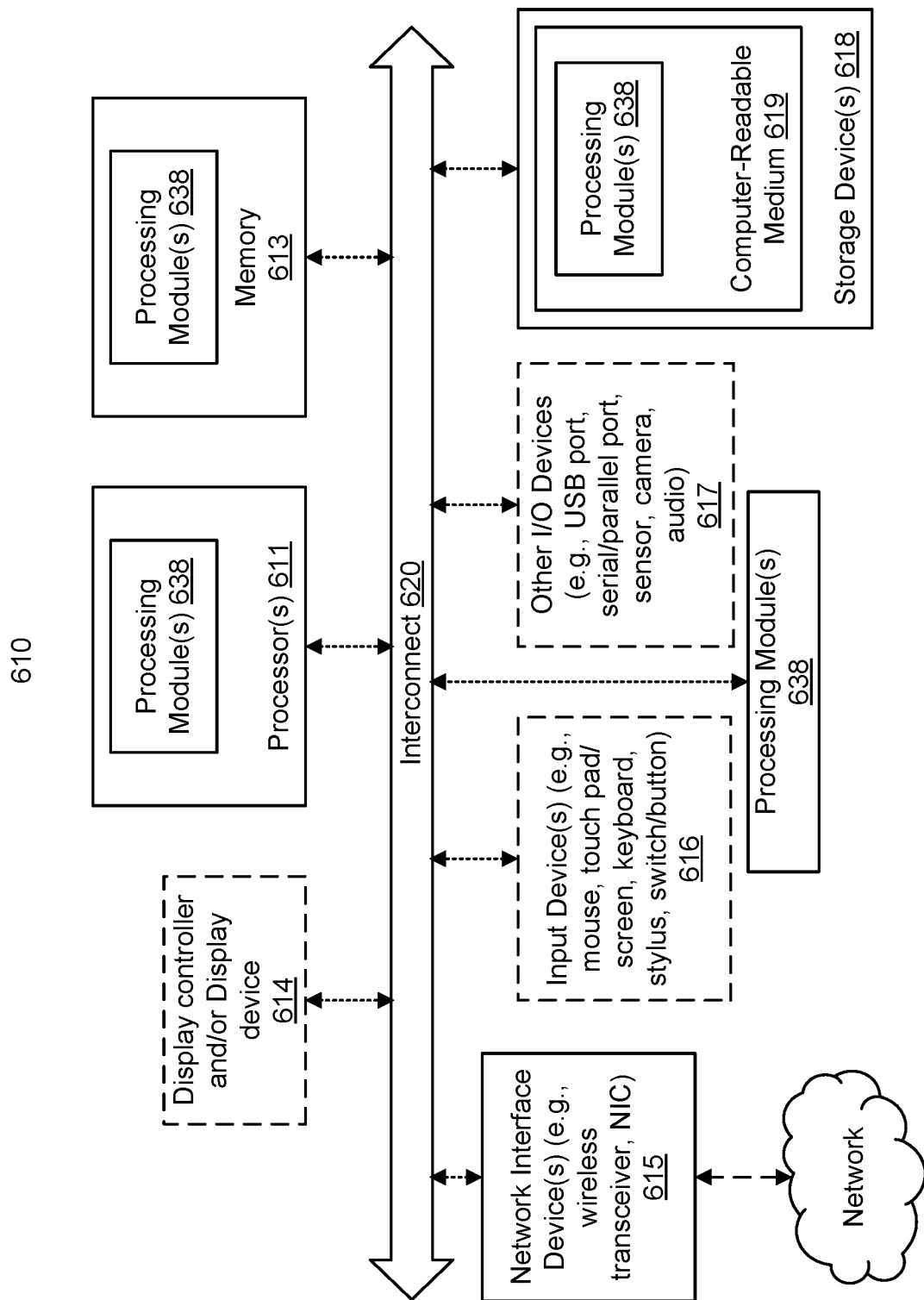
FIG. 6 shows a block diagram illustrating a data processing system in accordance with an embodiment.

Any of the components illustrated in FIGS. 1-5J may be implemented with one or more computing devices. Turning to FIG. 6, a block diagram illustrating an example of a data processing system (e.g., a computing device) in accordance with an embodiment is shown. For example, system 610 may represent any of data processing systems described above performing any of the processes or methods described above. System 610 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 610 is intended to show a high level view of many components of the computer system. However, it is to be understood that additional components may be present in certain implementations and furthermore, different arrangement of the components shown may occur in other implementations. System 610 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 610 includes processor 611, memory 613, and devices 615-617 via a bus or an interconnect 620. Processor 611 may represent a single processor or multiple processors with a single processor core or multiple processor cores included therein. Processor 611 may represent one or more general-purpose processors such as a microprocessor, a central processing unit (CPU), or the like. More particularly, processor 611 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 611 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 611, which may be a low power multi-core processor socket such as an ultra-low voltage processor, may act as a main processing unit and central hub for communication with the various components of the system. Such processor can be implemented as a system on chip (SoC). Processor 611 is configured to execute instructions for performing the operations discussed herein. System 610 may further include a graphics interface that communicates with optional graphics subsystem 614, which may include a display controller, a graphics processor, and/or a display device.

Processor 611 may communicate with memory 613, which in one embodiment can be implemented via multiple memory devices to provide for a given amount of system memory. Memory 613 may include one or more volatile storage (or memory) devices such as random access memory (RAM), dynamic RAM (DRAM), synchronous DRAM (SDRAM), static RAM (SRAM), or other types of storage devices. Memory 613 may store information including sequences of instructions that are executed by processor 611, or any other device. For example, executable code and/or data of a variety of operating systems, device drivers, firmware (e.g., input output basic system or BIOS), and/or applications can be loaded in memory 613 and executed by processor 611. An operating system can be any kind of operating systems, such as, for example, Windows© operating system from Microsoft*, Mac OS©/iOS© from Apple, Android© from Google©, Linux©, Unix©, or other real-time or embedded operating systems such as VxWorks.

System 610 may further include IO devices such as devices (e.g., 615, 616, 617, 618) including network interface device(s) 615, optional input device(s) 616, and other optional IO device(s) 617. Network interface device(s) 615 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 616 may include a mouse, a touch pad, a touch sensitive screen (which may be integrated with a display device of optional graphics subsystem 614), a pointer device such as a stylus, and/or a keyboard (e.g., physical keyboard or a virtual keyboard displayed as part of a touch sensitive screen). For example, input device(s) 616 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity data collector arrays or other elements for determining one or more points of contact with the touch screen.

IO devices 617 may include an audio device. An audio device may include a speaker and/or a microphone to facilitate voice-enabled functions, such as voice recognition, voice replication, digital recording, and/or telephony functions. Other IO devices 617 may further include universal serial bus (USB) port(s), parallel port(s), serial port(s), a printer, a network interface, a bus bridge (e.g., a PCI-PCI bridge), data collector(s) (e.g., a motion data collector such as an accelerometer, gyroscope, a magnetometer, a light data collector, compass, a proximity data collector, etc.), or a combination thereof. IO device(s) 617 may further include an imaging processing subsystem (e.g., a camera), which may include an optical data collector, such as a charged coupled device (CCD) or a complementary metal-oxide semiconductor (CMOS) optical data collector, utilized to facilitate camera functions, such as recording photographs and video clips. Certain data collectors may be coupled to interconnect 620 via a data collector hub (not shown), while other devices such as a keyboard or thermal data collector may be controlled by an embedded controller (not shown), dependent upon the specific configuration or design of system 610.

To provide for persistent storage of information such as data, applications, one or more operating systems and so forth, a mass storage (not shown) may also couple to processor 611. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 611, e.g., via a serial peripheral interface (SPI). This flash device may provide for non-volatile storage of system software, including a basic input/output software (BIOS) as well as other firmware of the system.

Storage device 618 may include computer-readable storage medium 619 (also known as a machine-readable storage medium or a computer-readable medium) on which is stored one or more sets of instructions or software (e.g., processing module, unit, and/or processing module/unit/logic 638) embodying any one or more of the methodologies or functions described herein. Processing module/unit/logic 638 may represent any of the components described above. Processing module/unit/logic 638 may also reside, completely or at least partially, within memory 613 and/or within processor 611 during execution thereof by system 610, memory 613 and processor 611 also constituting machine-accessible storage media. Processing module/unit/logic 638 may further be transmitted or received over a network via network interface device(s) 615.

Computer-readable storage medium 619 may also be used to store some software functionalities described above persistently. While computer-readable storage medium 619 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 638, components and other features described herein can be implemented as discrete hardware components or integrated in the functionality of hardware components such as ASICS, FPGAs, DSPs or similar devices. In addition, processing module/unit/logic 638 can be implemented as firmware or functional circuitry within hardware devices. Further, processing module/unit/logic 638 can be implemented in any combination hardware devices and software components.

Note that while system 610 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for aggregating data in a data aggregator and collected by data collectors in a distributed system, the method comprising:
   obtaining, by the data aggregator, a sampling pattern;
   obtaining, by the data aggregator, predictions of data collected by the data collectors;
   obtaining, by the data aggregator, the data collected from a portion of the data collectors defined by the sampling pattern; and
   updating, by the data aggregator and using an objective function that weighs, at least, energy consumption for obtaining the data from the data collectors and communication bandwidth between the data aggregator and the data collectors, the sampling pattern based on the data collected from the portion of the data collectors and a portion of the predictions corresponding to the data collected from the portion of the data collectors.

2. The computer-implemented method of claim 1, further comprising:
   obtaining, by the data aggregator, second predictions of second data collected by the data collectors; and
   obtaining, by the data aggregator, the second data collected from a second portion of the data collectors defined by the updated sampling pattern.

3. The computer-implemented method of claim 2, wherein the updated sampling pattern is different from the sampling pattern.

4. The computer-implemented method of claim 3, wherein the sampling pattern is updated using reinforced learning, the reinforced learning modifying a pattern selection model adapted to generate the sampling pattern.

5. The computer-implemented method of claim 4, wherein the sampling pattern specifies a frequency and a sequence of obtaining data samples from the data collectors, the sampling pattern indicating that the data collected from a third portion of the data collectors is not to be obtained, and the predictions corresponding to the data collected by the third portion of the data collectors is to be treated, by the data aggregator, as accurate without comparison to the data collected by the third portion of the data collectors.

6. The computer-implemented method of claim 1, wherein the data is obtained via a communication system that operably connects the data collectors to a data aggregator, wherein the communication system has a communication bandwidth.

7. The computer-implemented method of claim 1, further comprising:
   storing a portion of the predictions and the data collected from a portion of the data collectors defined by the sampling pattern as validated data, the validated data being treated by the data aggregator as accurate representations of measurements performed by the data collectors.

8. The computer-implemented method of claim 1, wherein the objective function also weighs uncertainties in the predictions.

9. The computer-implemented method of claim 8, wherein the objective function also weighs differences between portions of the data and corresponding ones of the predictions.

10. The computer-implemented method of claim 1, wherein the sampling pattern is selected using a pattern selection model, the pattern selection model comprises a trained machine learning model.

11. A non-transitory machine-readable medium having instructions stored therein, which when executed by a processor, cause the processor to perform operations for aggregating data in a data aggregator and collected by data collectors in a distributed system, the operations comprising:
   obtaining, by the data aggregator, a sampling pattern;
   obtaining, by the data aggregator, predictions of data collected by the data collectors;
   obtaining, by the data aggregator, the data collected from a portion of the data collectors defined by the sampling pattern; and
   updating, by the data aggregator and using an objective function that weighs, at least, energy consumption for obtaining the data from the data collectors and communication bandwidth between the data aggregator and the data collectors, the sampling pattern based on the data collected from the portion of the data collectors and a portion of the predictions corresponding to the data collected from the portion of the data collectors.

12. The non-transitory machine-readable medium of claim 11, wherein the operations further comprise:
obtaining, by the data aggregator, second predictions of second data collected by the data collectors; and
obtaining, by the data aggregator, the second data collected from a second portion of the data collectors defined by the updated sampling pattern.

13. The non-transitory machine-readable medium of claim 12, wherein the updated sampling pattern is different from the sampling pattern.

14. The non-transitory machine-readable medium of claim 13, wherein the sampling pattern is updated using reinforced learning, the reinforced learning modifying a pattern selection model adapted to generate the sampling pattern.

15. The non-transitory machine-readable medium of claim 14, wherein the sampling pattern specifies a frequency and a sequence of obtaining data samples from the data collectors, the sampling pattern indicating that the data collected from a third portion of the data collectors is not to be obtained, and the predictions corresponding to the data collected by the third portion of the data collectors is to be treated, by the data aggregator, as accurate without comparison to the data collected by the third portion of the data collectors.

16. The non-transitory machine-readable medium of claim 11, wherein the data is obtained via a communication system that operably connects the data collectors to a data aggregator, wherein the communication system has a communication bandwidth.

17. The non-transitory machine-readable medium of claim 11, wherein the operations further comprise:
storing a portion of the predictions and the data collected from a portion of the data collectors defined by the sampling pattern as validated data, the validated data being treated by the data aggregator as accurate representations of measurements performed by the data collectors.

18. A system, comprising:
a hardware processor; and
a memory coupled to the processor to store instructions, which when executed by the hardware processor, causes operations for aggregating data in the data aggregator and collected by data collectors in a distributed system to be performed, the operations comprising:
obtaining, by the data aggregator, a sampling pattern;
obtaining, by the data aggregator, predictions of data collected by the data collectors;
obtaining, by the data aggregator, the data collected from a portion of the data collectors defined by the sampling pattern; and
updating, by the data aggregator and using an objective function that weighs, at least, energy consumption for obtaining the data from the data collectors and communication bandwidth between the data aggregator and the data collectors, the sampling pattern based on the data collected from the portion of the data collectors and a portion of the predictions corresponding to the data collected from the portion of the data collectors.

19. The system of claim 18, wherein the operations further comprise:
obtaining, by the data aggregator, second predictions of second data collected by the data collectors; and
obtaining, by the data aggregator, the second data collected from a second portion of the data collectors defined by the updated sampling pattern.

20. The system of claim 19, wherein the updated sampling pattern is different from the sampling pattern.

* * * * *